United States Patent
Wu et al.

(10) Patent No.: US 11,323,366 B2
(45) Date of Patent: May 3, 2022

(54) PATH DETERMINING METHOD, APPARATUS, AND SYSTEM

(71) Applicant: HUAWEI TECHNOLOGIES CO., LTD., Shenzhen (CN)

(72) Inventors: Nan Wu, Beijing (CN); Shunwan Zhuang, Beijing (CN); Hui Ni, Shenzhen (CN); Zhenbin Li, Beijing (CN); Xia Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 16/221,568

(22) Filed: Dec. 16, 2018

(65) Prior Publication Data
US 2019/0140949 A1 May 9, 2019

Related U.S. Application Data

(63) Continuation of application No. PCT/CN2017/084376, filed on May 15, 2017.

(30) Foreign Application Priority Data

Jun. 16, 2016 (CN) .......................... 201610430019.9

(51) Int. Cl.
*H04L 45/741* (2022.01)
*H04L 45/50* (2022.01)
(Continued)

(52) U.S. Cl.
CPC ........ *H04L 45/741* (2013.01); *H04J 14/0256* (2013.01); *H04J 14/0267* (2013.01);
(Continued)

(58) Field of Classification Search
CPC ......... H04L 41/12; H04L 45/02; H04L 45/42; H04L 45/741; H04L 45/50; H04L 45/04
See application file for complete search history.

(56) References Cited

U.S. PATENT DOCUMENTS

2011/0013517 A1\* 1/2011 So .......................... H04L 47/724
 370/238
2011/0090787 A1\* 4/2011 Smith ..................... H04L 45/32
 370/225
(Continued)

FOREIGN PATENT DOCUMENTS

CN 101616063 A 12/2009
CN 103348637 A 10/2013
(Continued)

OTHER PUBLICATIONS

Xiaoshuang Li:"SDN-Based Control Optimization Technology of the Combination of IP Network and Optical Network". Beijing University of Posts and Telecommunications. Cnki. Aug. 2015. total 88 pages. With partial English translation.
(Continued)

*Primary Examiner* — Anez C Ebrahim
(74) *Attorney, Agent, or Firm* — Maier & Maier, PLLC

(57) ABSTRACT

Embodiments of the present invention disclose a path determining method, apparatus, and system. In a hybrid network including one controller for implementing a control function, the controller may separately obtain network topology information of a first network and a second network of different network types by using a same control channel protocol. When the controller obtains a path determining requirement for the data transmission path, because the controller has the network topology information of the first network and the second network, during computation of the data transmission path, the controller can determine a path computation result including transmission path parts of the first network and the second network, without performing additional information exchange with another device, and send the path computation result to the first network device.
(Continued)

In this way, planning efficiency of the data transmission path is improved.

15 Claims, 11 Drawing Sheets

(51) Int. Cl.
*H04J 14/02* (2006.01)
*H04L 45/00* (2022.01)
*H04L 41/12* (2022.01)
*H04L 45/02* (2022.01)
*H04L 45/42* (2022.01)

(52) U.S. Cl.
CPC .......... *H04J 14/0272* (2013.01); *H04L 41/12* (2013.01); *H04L 45/02* (2013.01); *H04L 45/04* (2013.01); *H04L 45/42* (2013.01); *H04L 45/50* (2013.01)

(56) References Cited

U.S. PATENT DOCUMENTS

| | | | |
|---|---|---|---|
| 2011/0093612 A1* | 4/2011 | Murakami | .......... H04L 63/1408 709/238 |
| 2012/0076046 A1 | 3/2012 | Lin | |
| 2012/0207163 A1 | 8/2012 | Schrum | |
| 2013/0067056 A1 | 3/2013 | Purkayastha et al. | |
| 2014/0269260 A1 | 9/2014 | Xue | |
| 2015/0063802 A1 | 3/2015 | Bahadur et al. | |
| 2016/0134510 A1* | 5/2016 | Xuan | ...................... H04L 41/12 370/254 |
| 2017/0171058 A1 | 6/2017 | Wang | |

FOREIGN PATENT DOCUMENTS

| | | |
|---|---|---|
| CN | 103688497 A | 3/2014 |
| CN | 103828440 A | 5/2014 |
| CN | 105376162 A | 3/2016 |
| EP | 3038303 B1 | 9/2018 |

OTHER PUBLICATIONS

L .Dhody et al:"PCEP Extension for Distribution of Link-State and TE Information.", IETF Internet-Draft, Mar. 15, 2016, XP055566101, 36 pages.

* cited by examiner

PATH DETERMINING METHOD, APPARATUS, AND SYSTEM

CROSS-REFERENCE TO RELATED APPLICATIONS

This application is a continuation of International Application No. PCT/CN2017/084376, filed on May 15, 2017, which claims priority to Chinese Patent Application No. 201610430019.9, filed on Jun. 16, 2016. The disclosures of the aforementioned applications are hereby incorporated by reference in their entireties.

TECHNICAL FIELD

The present invention relates to the communications field, and in particular, to a path determining method, apparatus, and system.

BACKGROUND

With development of network technologies, there are an increasing number of network types, for example, an optical network that mainly uses an optical fiber for transmission, and a conventional Internet Protocol (IP) network. During network deployment, a hybrid network may occur, and the hybrid network may include different types of networks. For example, the hybrid network includes an IP network and an optical network. In the hybrid network, there is a mutual connection relationship between network topologies of different types of networks. Therefore, a data transmission path between two network nodes in the hybrid network may pass through different types of networks. For example, in a hybrid network including an optical network and an IP network, a topology of the IP network needs to be used for one part of a data transmission path between a network node a and a network node b, and a topology of the optical network needs to be used for the other part.

During planning of a data transmission path between network nodes in a hybrid network, if the data transmission path needs to pass through a plurality of networks of different types, network topology information of the plurality of networks needs to be comprehensively considered to complete planning of the entire data transmission path. A controller of a network manages network topology information of the network, and network topology information of different types of networks is separately managed by different controllers. Therefore, a controller can learn network topology information of a network in which the controller is located, but cannot learn network topology information of another network. Therefore, in a process of planning a cross-network data transmission path in a hybrid network, each of controllers of a plurality of networks needs to compute a part of the data transmission path in a network in which the controller is located, and then the plurality of controllers need to exchange data with each other for a plurality of times to implement complete planning of the data transmission path. In this path determining manner, massive data exchange needs to be performed between the controllers, and planning efficiency of the data transmission path is low.

SUMMARY

To resolve the foregoing technical problem, embodiments of the present invention provide a path determining method, apparatus, and system, to improve planning efficiency of a data transmission path.

According to a first aspect, an embodiment of the present invention provides a path determining method, applied to a hybrid network including one controller for implementing a control function, where the hybrid network includes a first network and a second network, and the method includes:

obtaining, by the controller, a path determining requirement, where the path determining requirement is used to request to determine a data transmission path from a first network device to a second network device that includes a transmission path part in the first network and a transmission path part in the second network, the path determining requirement includes an identifier of the first network device and an identifier of the second network device, and both the first network device and the second network device are network devices in the first network;

obtaining, by the controller, network topology information of the first network from a network device in the first network and network topology information of the second network from a network device in the second network according to a control channel protocol;

calculating, by the controller, a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network; and sending, by the controller, the path computation result to the first network device.

It can be learned that in the hybrid network, the controller may separately obtain the network topology information of the first network and the second network of different network types by using a same control channel protocol. When the controller obtains the path determining requirement for the data transmission path, because the controller has the network topology information of the first network and the second network, during computation of the data transmission path, the controller can determine the path computation result including the transmission path parts of the first network and the second network, without performing additional information exchange with another device, and send the path computation result to the first network device. In this way, planning efficiency of the data transmission path is improved.

In a first possible implementation of the first aspect, the sending, by the controller, the path computation result to the first network device includes:

sending, by the controller to the first network device, a PCEP message that carries the path computation result, where the PCEP message includes path information fields, the path information fields are used to carry interface information of network devices through which the data transmission path successively passes, the interface information includes egress interface information or ingress interface information of the network devices, and for one link in the data transmission path, the PCEP message carries interface information of at least one of an egress interface and an ingress interface of the link on a network device by using the path information field.

It can be learned that the path information fields in the PCEP message may successively carry the interface information in the path computation result, so that the first network device that receives the PCEP message can determine, by using the path information fields, the interface information required for establishing the data transmission path.

With reference to the first possible implementation of the first aspect, in a second possible implementation, the PCEP message includes a PCEP-reply message or a PCEP-update message.

Using an existing message type as the PCEP message can ensure that the PCEP message may be identified by the first network device in different application scenarios, and no new PCEP message type needs to be additionally defined, thereby making implementation of the solution less complex.

With reference to the first aspect or the first or the second possible implementation of the first aspect, in a third possible implementation, the control channel protocol is the PCEP, and the step of obtaining, by the controller, network topology information of the second network from a network device in the second network may include:

obtaining, by the controller, the network topology information of the second network based on a PCEP-LS message sent by the network device in the second network, where a universal routing field in the PCEP-LS message identifies the second network by using a value.

It can be learned that, because of an identification function of the universal routing field in the PCEP-LS message, the controller can identify the PCEP-LS message that carries the network topology information of the second network from a received PCEP-LS message.

With reference to the third possible implementation of the first aspect, in a fourth possible implementation, the PCEP-LS message further includes a node object used to identify the network device in the second network, the node object includes a descriptor of the network device in the second network, and the descriptor of the network device in the second network is used to carry an identifier and an attribute of the network device in the second network.

It can be learned that the controller can determine the network device in the second network by using content carried in the descriptor in the node object in the PCEP-LS message.

With reference to the third possible implementation of the first aspect, in a fifth possible implementation, the PCEP-LS message further includes a link object used to identify the network device in the second network;

the link object includes a link descriptor, and the link descriptor is used to carry link information of a link between the network device in the second network and a neighboring network device; and the link descriptor includes a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

It can be learned that the controller can determine the link information of the link between the network device in the second network and the neighboring network device by using content carried in the link descriptor in the link object in the PCEP-LS message.

With reference to the fifth possible implementation of the first aspect, in a sixth possible implementation, the first network is an IP network, in the link object in the PCEP-LS message sent by the network device in the second network, the link descriptor further includes an IP neighbor address field, and the IP neighbor address field is used to carry an IP address of a network device that is in the first network and that is adjacent to the network device in the second network.

It can be learned that when the neighboring network device is a network device in the first network, the controller can further determine link information of a link between the network device in the second network and the network device in the first network by using the IP neighbor address field included in the link descriptor.

In a seventh possible implementation of the first aspect, the first network is an IP network, and the method further includes:

receiving, by the controller, a PCEP-LS message sent by the first network device, where a universal routing field in the PCEP-LS message identifies the first network by using a value, a link object includes a link descriptor, and the link descriptor includes a local node descriptor, a remote node descriptor, a link identifier field, and an opaque link attribute field; the local node descriptor and the remote node descriptor in the link descriptor are used to carry local node information and remote node information of a VTE link; and the link identifier field in the link descriptor is used to carry a virtual local identifier and a virtual remote identifier of the VTE link, the opaque link attribute field in the link descriptor is used to carry a local identifier and a remote identifier of the VTE link, and the VTE link is a virtual link of a data transmission link between the first network device and the second network device in the IP network.

It can be learned that the first network device may further report information about the established VTE link to the controller by using the PCEP-LS message, so that the controller can quickly learn the related information about the established VTE link, and therefore the controller can accurately regulate, control, and manage the hybrid network.

With reference to the seventh possible implementation of the first aspect, in an eighth possible implementation, the link descriptor further includes a local IP address field and a remote IP address field, the local IP address field in the link descriptor is used to carry local interface information of the VTE link on the first network device, and the remote IP address field in the link descriptor is used to carry remote interface information of the VTE link on the second network device.

It can be learned that, because both the first network device and the second network device are network devices in the IP network, the link descriptor in the PCEP-LS message may be used to carry interface information of the VTE link in the IP network, to further complete related information about the VTE link for the controller.

In a ninth possible implementation of the first aspect, before the obtaining, by the controller, a path determining requirement, the method further includes:

obtaining, by the controller, planning data of a virtual path, where the planning data includes the identifier of the first network device serving as a starting end of the virtual path, the identifier of the second network device serving as a termination end of the virtual path, an identifier of the virtual path, path information of the virtual path in the first network, and path information of the virtual path in the second network, and the path determining requirement obtained by the controller further includes the identifier of the virtual path; and the calculating, by the controller, a path computation result based on the identifier of the first network device, the identifier of the second network device, the topology information of the first network, and the topology information of the second network includes:

performing, by the controller, matching on the planning data based on the identifier of the first network device, the identifier of the second network device, and the identifier of the virtual path; and computing the data transmission path for the virtual link based on the planning data, the network topology information of the first network, and the network topology information of the second network, and determining the path computation result.

It can be learned that the planning data of the cross-network data transmission path in the hybrid network may be determined in advance through manual planning, so that the controller can determine the path computation result based on the planning data by using the topology information of the first network and the topology information of the second network, thereby improving determining efficiency of the path computation result.

According to a second aspect, an embodiment of the present invention provides a path determining apparatus, applied to a hybrid network including one controller for implementing a control function, where the hybrid network includes a first network and a second network, and the apparatus includes an obtaining unit, a calculation unit, and a sending unit, where the obtaining unit is configured to obtain a path determining requirement, where the path determining requirement is used to request to determine a data transmission path from a first network device to a second network device that includes a transmission path part in the first network and a transmission path part in the second network, the path determining requirement includes an identifier of the first network device and an identifier of the second network device, and both the first network device and the second network device are network devices in the first network;

the obtaining unit is further configured to obtain network topology information of the first network from a network device in the first network and network topology information of the second network from a network device in the second network according to a control channel protocol;

the calculation unit is configured to calculate a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network; and the sending unit is configured to send the path computation result to the first network device.

It can be learned that in the hybrid network, the controller may separately obtain the network topology information of the first network and the second network of different network types by using a same control channel protocol. When the controller obtains the path determining requirement for the data transmission path, because the controller has the network topology information of the first network and the second network, during computation of the data transmission path, the controller can determine the path computation result including the transmission path parts of the first network and the second network, without performing additional information exchange with another device, and send the path computation result to the first network device. In this way, planning efficiency of the data transmission path is improved.

In a first possible implementation of the second aspect, the sending unit is specifically configured to send, to the first network device, a PCEP message that carries the path computation result, where the PCEP message includes path information fields, the path information fields are used to carry interface information of network devices through which the data transmission path successively passes, the interface information includes egress interface information or ingress interface information of the network devices, and for one link in the data transmission path, the PCEP message carries interface information of at least one of an egress interface and an ingress interface of the link on a network device by using the path information field.

It can be learned that the path information fields in the PCEP message may successively carry the interface information in the path computation result, so that the first network device that receives the PCEP message can determine, by using the path information fields, the interface information required for establishing the data transmission path.

With reference to the first possible implementation of the second aspect, in a second possible implementation, the PCEP message includes a PCEP-reply message or a PCEP-update message.

Using an existing message type as the PCEP message can ensure that the PCEP message may be identified by the first network device in different application scenarios, and no new PCEP message type needs to be additionally defined, thereby making implementation of the solution less complex.

With reference to the second aspect or the first or the second possible implementation of the second aspect, in a third possible implementation, the control channel protocol is the PCEP, and the obtaining unit is specifically configured to obtain the network topology information of the second network based on a PCEP-LS message sent by the network device in the second network, where a universal routing field in the PCEP-LS message identifies the second network by using a value.

It can be learned that, because of an identification function of the universal routing field in the PCEP-LS message, the PCEP-LS message that carries the network topology information of the second network can be identified from a received PCEP-LS message.

With reference to the third possible implementation of the second aspect, in a fourth possible implementation, the PCEP-LS message further includes a node object used to identify the network device in the second network, the node object includes a descriptor of the network device in the second network, and the descriptor of the network device in the second network is used to carry an identifier and an attribute of the network device in the second network.

It can be learned that the network device in the second network can be determined by using content carried in the descriptor in the node object in the PCEP-LS message.

With reference to the third possible implementation of the second aspect, in a fifth possible implementation, the PCEP-LS message further includes a link object used to identify the network device in the second network;

the link object includes a link descriptor, and the link descriptor is used to carry link information of a link between the network device in the second network and a neighboring network device; and the link descriptor includes a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

It can be learned that the link information of the link between the network device in the second network and the neighboring network device can be determined by using content carried in the link descriptor in the link object in the PCEP-LS message.

With reference to the fifth possible implementation of the second aspect, in a sixth possible implementation, the first network is an IP network, in the link object in the PCEP-LS message sent by the network device in the second network, the link descriptor further includes an IP neighbor address field, and the IP neighbor address field is used to carry an IP address of a network device that is in the first network and that is adjacent to the network device in the second network.

It can be learned that when the neighboring network device is a network device in the first network, link information of a link between the network device in the second network and the network device in the first network can be further determined by using the IP neighbor address field included in the link descriptor.

In a seventh possible implementation of the second aspect, the first network is an IP network, and the obtaining unit is further configured to receive a PCEP-LS message sent by the first network device, where a universal routing field in the PCEP-LS message identifies the first network by using a value, a link object includes a link descriptor, and the link descriptor includes a local node descriptor, a remote node descriptor, a link identifier field, and an opaque link attribute field; the local node descriptor and the remote node descriptor in the link descriptor are used to carry local node information and remote node information of a VTE link; and the link identifier field in the link descriptor is used to carry a virtual local identifier and a virtual remote identifier of the VTE link, the opaque link attribute field in the link descriptor is used to carry a local identifier and a remote identifier of the VTE link, and the VTE link is a virtual link of a data transmission link between the first network device and the second network device in the IP network.

It can be learned that the first network device may further report information about the established VTE link by using the PCEP-LS message, so that the related information about the established VTE link can be quickly learned, and therefore the hybrid network can be accurately regulated, controlled, and managed.

With reference to the seventh possible implementation of the second aspect, in an eighth possible implementation, the link descriptor further includes a local IP address field and a remote IP address field, the local IP address field in the link descriptor is used to carry local interface information of the VTE link on the first network device, and the remote IP address field in the link descriptor is used to carry remote interface information of the VTE link on the second network device.

It can be learned that, because both the first network device and the second network device are network devices in the IP network, the link descriptor in the PCEP-LS message may be used to carry interface information of the VTE link in the IP network, to further complete related information about the VTE link for the controller.

In a ninth possible implementation of the second aspect, the obtaining unit is further configured to obtain planning data of a virtual path, where the planning data includes the identifier of the first network device serving as a starting end of the virtual path, the identifier of the second network device serving as a termination end of the virtual path, an identifier of the virtual path, path information of the virtual path in the first network, and path information of the virtual path in the second network, and the path determining requirement obtained by the controller further includes the identifier of the virtual path; and the calculation unit is further configured to: perform matching on the planning data based on the identifier of the first network device, the identifier of the second network device, and the identifier of the virtual path; and compute the data transmission path for the virtual link based on the planning data, the network topology information of the first network, and the network topology information of the second network, and determine the path computation result.

It can be learned that the planning data of the cross-network data transmission path in the hybrid network may be determined in advance through manual planning, so that the controller can determine the path computation result based on the planning data by using the topology information of the first network and the topology information of the second network, thereby improving determining efficiency of the path computation result.

According to a third aspect, an embodiment of the present invention provides a path determining method, applied to a hybrid network including one controller for implementing a control function, where the hybrid network includes a first network and a second network, both a first network device and a second network device are network devices in the first network, and the method includes:

obtaining, by the first network device, a path computation result sent by the controller, where the path computation result is calculated by the controller based on an identifier of the first network device, an identifier of the second network device, network topology information of the first network, and network topology information of the second network, the path computation result includes a computation result of a transmission path part of a data transmission path in the first network and a computation result of a transmission path part of the data transmission path in the second network, and the data transmission path is a data transmission path from the first network device to the second network device that includes the transmission path part in the first network and the transmission path part in the second network; and establishing, by the first network device, the data transmission path based on the path computation result.

It can be learned that in the hybrid network in which one controller implements a control function, a network device in the first network may obtain the path computation result from the controller, where the path computation result includes the computation result of the transmission path part of the data transmission path in the first network and the computation result of the transmission path part of the data transmission path in the second network, and the computation result that is of the transmission path part of the data transmission path in the second network and that is obtained by the first network device is unencrypted. Therefore, when the first network device starts to establish the data transmission path, additional information exchange between a network device in the second network and another controller in a conventional manner can be avoided, thereby improving establishment efficiency of the data transmission path.

In a first possible implementation of the third aspect, the obtaining, by the first network device, a path computation result sent by the controller includes:

obtaining, by the first network device, a PCEP message sent by the controller, where the PCEP message carries the path computation result, the PCEP message includes a plurality of path information fields successively arranged based on a transmission sequence of the data transmission path, the path information field is used to carry interface information of a link, in the data transmission path, on a network device, the interface information includes egress interface information or ingress interface information of the link, in the data transmission path, on the network device, and for one link in the data transmission path, the PCEP message carries at least interface information of at least one of an egress interface and an ingress interface of the link on a network device by using the path information field.

It can be learned that the path information fields in the PCEP message may successively carry interface information in the path computation result, so that the first network device can determine, by using the path information fields, the interface information required for establishing the data transmission path.

With reference to the first possible implementation of the third aspect, in a second possible implementation, the PCEP message includes a PCEP-reply message or a PCEP-update message.

Using an existing message type as the PCEP message can ensure that the PCEP message may be identified by the first network device in different application scenarios, and no new PCEP message type needs to be additionally defined, thereby making implementation of the solution less complex.

According to a fourth aspect, an embodiment of the present invention provides a path determining apparatus, applied to a hybrid network including one controller for implementing a control function, where the hybrid network includes a first network and a second network, both a first network device and a second network device are network devices in the first network, and the apparatus includes an obtaining unit and an establishment unit, where the obtaining unit is configured to obtain a path computation result sent by the controller, where the path computation result is calculated by the controller based on an identifier of the first network device, an identifier of the second network device, network topology information of the first network, and network topology information of the second network, the path computation result includes a computation result of a transmission path part of a data transmission path in the first network and a computation result of a transmission path part of the data transmission path in the second network, and the data transmission path is a data transmission path from the first network device to the second network device that includes the transmission path part in the first network and the transmission path part in the second network; and the establishment unit is configured to establish the data transmission path based on the path computation result.

It can be learned that in the hybrid network in which one controller implements a control function, the obtaining unit may obtain the path computation result from the controller, where the path computation result includes the computation result of the transmission path part of the data transmission path in the first network and the computation result of the transmission path part of the data transmission path in the second network, and the obtained computation result of the transmission path part of the data transmission path in the second network is unencrypted. Therefore, when the establishment unit starts to establish the data transmission path, additional information exchange between a network device in the second network and another controller in a conventional manner can be avoided, thereby improving establishment efficiency of the data transmission path.

In a first possible implementation of the fourth aspect, the obtaining unit is specifically configured to obtain a PCEP message sent by the controller, where the PCEP message carries the path computation result, the PCEP message includes a plurality of path information fields successively arranged based on a transmission sequence of the data transmission path, the path information field is used to carry interface information of a link, in the data transmission path, on a network device, the interface information includes egress interface information or ingress interface information of the link, in the data transmission path, on the network device, and for one link in the data transmission path, the PCEP message carries at least interface information of at least one of an egress interface and an ingress interface of the link on a network device by using the path information field.

It can be learned that the path information fields in the PCEP message may successively carry interface information in the path computation result, so that the interface information required for establishing the data transmission path can be determined by using the path information fields.

With reference to the first possible implementation of the fourth aspect, in a second possible implementation, the PCEP message includes a PCEP-reply message or a PCEP-update message.

Using an existing message type as the PCEP message can ensure that the PCEP message may be identified in different application scenarios, and no new PCEP message type needs to be additionally defined, thereby making implementation of the solution less complex.

According to a fifth aspect, an embodiment of the present invention provides a path determining method, applied to a hybrid network including one controller for implementing a control function, where the hybrid network includes a first network and a second network, the second network is an optical network, a target network device is a network device in the second network, and the method includes:

sending, by the target network device, network topology information of the second network to the controller according to a control channel protocol, where the control channel protocol is the same as a control channel protocol used by a network device in the first network to send network topology information of the first network to the controller.

It can be learned that in the hybrid network, the target network device in the optical network may send the network topology information of the second network to the controller according to the control channel protocol used by the network device in the first network to send the network topology information of the first network to the controller, so that one controller can separately obtain the network topology information of the first network and the second network of different network types by using a same control channel protocol, thereby implementing a control function of the controller in the hybrid network.

In a first possible implementation of the fifth aspect, the control channel protocol is the PCEP, and the sending, by the target network device, network topology information of the second network to the controller includes:

sending, by the target network device to the controller, a PCEP-LS message that carries the network topology information of the second network, where a universal routing field in the PCEP-LS message identifies the second network by using a value.

It can be learned that, because of an identification function of the universal routing field in the PCEP-LS message, the controller can identify the PCEP-LS message that carries the network topology information of the second network from a received PCEP-LS message.

With reference to the first possible implementation of the fifth aspect, in a second possible implementation, the PCEP-LS message further includes a node object used to identify a network device in the second network, the node object includes a descriptor of the network device in the second network, and the descriptor of the network device in the second network is used to carry an identifier and an attribute of the network device in the second network.

It can be learned that the controller can determine the network device in the second network by using content carried in the descriptor in the node object in the PCEP-LS message.

With reference to the first possible implementation of the fifth aspect, in a third possible implementation, the PCEP-LS message further includes a link object used to identify a network device in the second network; the link object includes a link descriptor, and the link descriptor is used to carry link information of a link between the network device in the second network and a neighboring network device; and the link descriptor includes a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

It can be learned that the controller can determine the link information of the link between the network device in the second network and the neighboring network device by using content carried in the link descriptor in the link object in the PCEP-LS message.

In a fourth possible implementation of the fifth aspect, the target network device is a network device in a data transmission path, a previous network device of the target network device in the data transmission path is a network device in the first network according to a transmission sequence of the data transmission path, and the data transmission path is a data transmission path from a first network device to a second network device that includes a transmission path part in the first network and a transmission path part in the second network; both the first network device and the second network device are network devices in the first network; and the method further includes:

obtaining, by the target network device, a computation result of the transmission path part of the data transmission path in the second network from the previous network device; and establishing, by the target network device, the data transmission path based on the computation result of the transmission path part of the data transmission path in the second network.

It can be learned that the computation result that is of the transmission path part of the data transmission path in the second network and that is obtained by the target network device may be directly identified and is unencrypted. Therefore, the target network device may directly continue to establish the data transmission path based on the computation result of the transmission path part of the data transmission path in the second network. In this way, additional information exchange with an optical controller in a conventional manner is avoided, thereby improving establishment efficiency of the data transmission path.

According to a sixth aspect, an embodiment of the present invention provides a path determining apparatus, applied to a hybrid network including one controller for implementing a control function, where the hybrid network includes a first network and a second network, the second network is an optical network, and the apparatus includes a sending unit, where the sending unit is configured to send network topology information of the second network to the controller according to a control channel protocol, where the control channel protocol is the same as a control channel protocol used by a network device in the first network to send network topology information of the first network to the controller.

It can be learned that in the hybrid network, the sending unit in the optical network may send the network topology information of the second network to the controller according to the control channel protocol used by the network device in the first network to send the network topology information of the first network to the controller, so that one controller can separately obtain the network topology information of the first network and the second network of different network types by using a same control channel protocol, thereby implementing a control function of the controller in the hybrid network.

In a first possible implementation of the sixth aspect, the control channel protocol is the PCEP, and the sending unit is specifically configured to send, to the controller, a PCEP-LS message that carries the network topology information of the second network, where a universal routing field in the PCEP-LS message identifies the second network by using a value.

It can be learned that, because of an identification function of the universal routing field in the PCEP-LS message, the controller can identify the PCEP-LS message that carries the network topology information of the second network from a received PCEP-LS message.

With reference to the first possible implementation of the sixth aspect, in a second possible implementation, the PCEP-LS message further includes a node object used to identify a network device in the second network, the node object includes a descriptor of the network device in the second network, and the descriptor of the network device in the second network is used to carry an identifier and an attribute of the network device in the second network.

It can be learned that the controller can determine the network device in the second network by using content carried in the descriptor in the node object in the PCEP-LS message.

With reference to the first possible implementation of the sixth aspect, in a third possible implementation, the PCEP-LS message further includes a link object used to identify a network device in the second network; the link object includes a link descriptor, and the link descriptor is used to carry link information of a link between the network device in the second network and a neighboring network device; and the link descriptor includes a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

It can be learned that the controller can determine the link information of the link between the network device in the second network and the neighboring network device by using content carried in the link descriptor in the link object in the PCEP-LS message.

In a fourth possible implementation of the sixth aspect, a target network device is a network device in a data transmission path, a previous network device of the target network device in the data transmission path is a network device in the first network according to a transmission sequence of the data transmission path, and the data transmission path is a data transmission path from a first network device to a second network device that includes a transmission path part in the first network and a transmission path part in the second network; both the first network device and the second network device are network devices in the first network; and the apparatus further includes a receiving unit, where the receiving unit is configured to obtain a computation result of the transmission path part of the data transmission path in the second network from the previous network device; and an establishment unit is further configured to establish the data transmission path based on the computation result of the transmission path part of the data transmission path in the second network.

It can be learned that the computation result that is of the transmission path part of the data transmission path in the second network and that is obtained by the receiving unit may be directly identified and is unencrypted. Therefore, the establishment unit may directly continue to establish the data transmission path based on the computation result of the transmission path part of the data transmission path in the second network. In this way, additional information exchange with an optical controller in a conventional manner is avoided, thereby improving establishment efficiency of the data transmission path.

According to a seventh aspect, an embodiment of the present invention provides a path determining system, applied to a hybrid network including one controller for implementing a control function, where the hybrid network includes a first network and a second network, and the system includes the controller and a first network device, where the controller is configured to: obtain a path determining requirement, where the path determining requirement is used to request to determine a data transmission path from the first network device to a second network device that includes a transmission path part in the first network and a transmission path part in the second network, the path determining requirement includes an identifier of the first network device and an identifier of the second network device, and both the first network device and the second network device are network devices in the first network; obtain network topology information of the first network from a network device in the first network and network topology information of the second network from a network device in the second network according to a control channel protocol; calculate a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network; and send the path computation result to the first network device; and the first network device is configured to: obtain the path computation result sent by the controller; and establish the data transmission path based on the path computation result.

It can be learned that in the hybrid network in which one controller implements a control function, the controller may separately obtain the network topology information of the first network and the second network of different network types by using a same control channel protocol. When the controller obtains the path determining requirement for the data transmission path, because the controller has the network topology information of the first network and the second network, during computation of the data transmission path, the controller can determine the path computation result including the transmission path parts of the first network and the second network, without performing additional information exchange with another device, and send the path computation result to the first network device. In this way, planning efficiency of the data transmission path is improved.

The computation result that is of the transmission path part of the data transmission path in the second network and that is obtained by the first network device is unencrypted. Therefore, when the first network device starts to establish the data transmission path, additional information exchange between the network device in the second network and another controller in a conventional manner can be avoided, thereby improving establishment efficiency of the data transmission path.

According to an eighth aspect, an embodiment of the present invention provides a path determining system, applied to a hybrid network including one controller for implementing a control function, where the hybrid network includes a first network and a second network, the second network is an optical network, a target network device is a network device in the second network, and the system includes the controller and the target network device, where the controller is configured to: obtain a path determining requirement, where the path determining requirement is used to request to determine a data transmission path from a first network device to a second network device that includes a transmission path part in the first network and a transmission path part in the second network, the path determining requirement includes an identifier of the first network device and an identifier of the second network device, and both the first network device and the second network device are network devices in the first network; obtain network topology information of the first network from a network device in the first network and network topology information of the second network from a network device in the second network according to a control channel protocol; calculate a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network; and send the path computation result to the first network device; and the target network device is configured to send the network topology information of the second network to the controller according to the control channel protocol, where the control channel protocol is the same as a control channel protocol used by the network device in the first network to send the network topology information of the first network to the controller.

It can be learned that in the hybrid network, the target network device in the optical network may send the network topology information of the second network to the controller according to the control channel protocol used by the network device in the first network to send the network topology information of the first network to the controller, so that one controller can separately obtain the network topology information of the first network and the second network of different network types by using a same control channel protocol, thereby implementing a control function of the controller in the hybrid network.

When the controller obtains the path determining requirement for the data transmission path, because the controller has the network topology information of the first network and the second network, during computation of the data transmission path, the controller can determine the path computation result including the transmission path parts of the first network and the second network, without performing additional information exchange with another device, and send the path computation result to the first network device. In this way, planning efficiency of the data transmission path is improved.

BRIEF DESCRIPTION OF DRAWINGS

To describe the technical solutions in the embodiments of the present invention, the following briefly describes the accompanying drawings required for describing the embodiments or the prior art.

DESCRIPTION OF EMBODIMENTS

Figure 1:
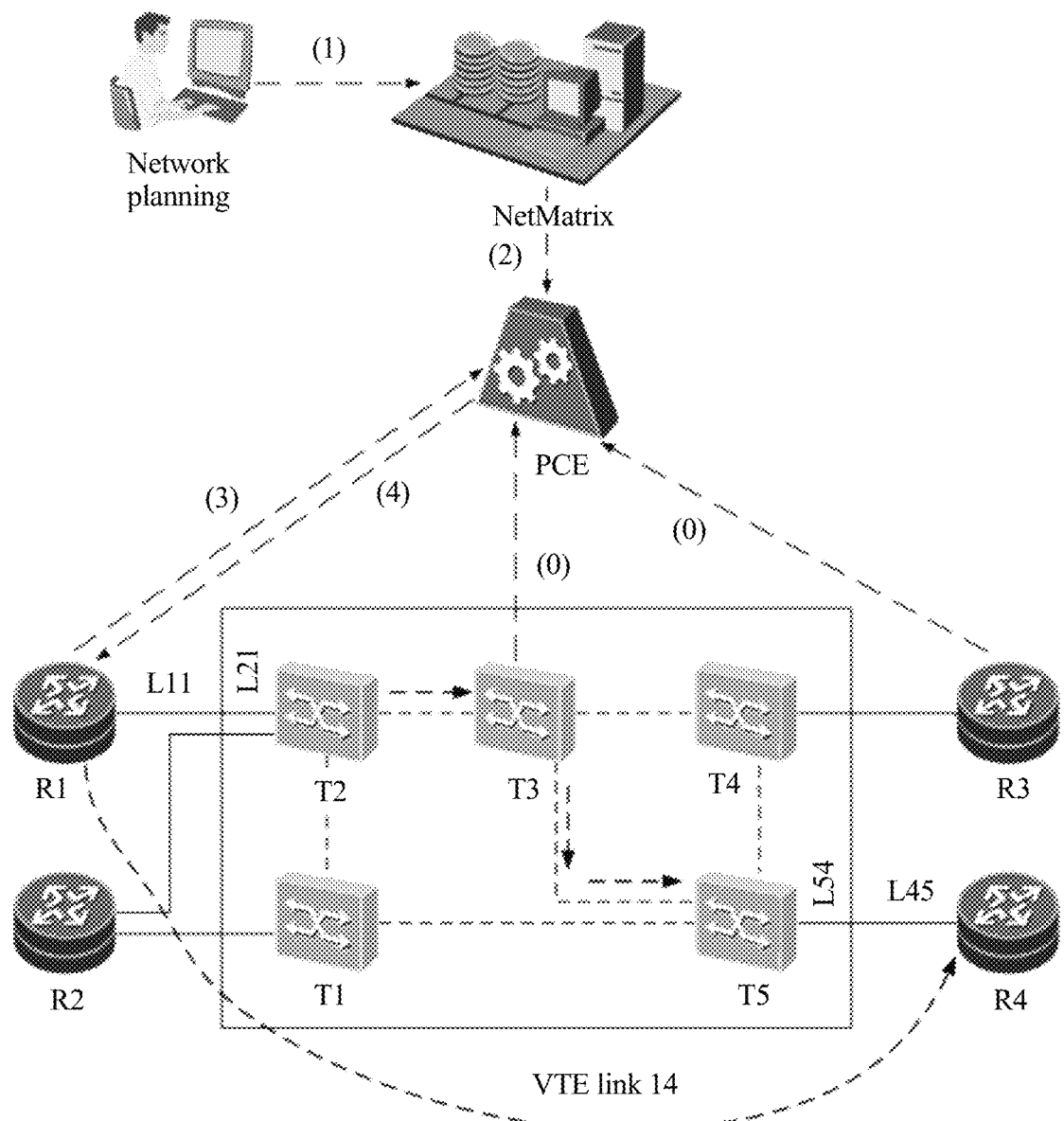
FIG. 1 is a schematic diagram of a procedure for determining a path in a hybrid network according to an embodiment of the present invention.

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

In a hybrid network, there is a mutual connection relationship between network topologies of different types of networks. Therefore, a data transmission path between two network nodes may pass through different types of networks.

During determining of a data transmission path between network nodes in a hybrid network, if the data transmission path needs to pass through a plurality of networks of different types, network topology information of the plurality of networks needs to be comprehensively considered to complete determining of the entire data transmission path. Because network topology information of different types of networks is independent of each other and network topology information of a network is unavailable to another network, in a process of determining the data transmission path, each of controllers of the plurality of networks needs to compute a path part of the data transmission path in a network in which the controller is located, and massive data exchange further needs to be performed between the plurality of controllers to implement complete determining of the data transmission path.

For example, in a hybrid network including an IP network and an optical network, one part of a data transmission path between two network devices may exist in the IP network, and the other part may exist in the optical network. During computation of the data transmission path, transmission path parts of the data transmission path in different networks need to be separately computed by controllers of the two networks. For example, a transmission path part of the data transmission part in the IP network needs to be computed by a controller of the IP network, and a transmission path part of the data transmission path in the optical network needs to be computed by a controller of the optical network. The controller of the IP network and the controller of the optical network interact with each other, and encrypt the transmission path parts in the respective networks. The two path transmission parts (at least one transmission path part has been encrypted) are combined into one path computation result, and then the path computation result is delivered to one of the two network devices, so as to implement subsequent path establishment.

Therefore, the embodiments of the present invention provide a path determining method, apparatus, and system. In a hybrid network, a controller may separately obtain network topology information of a first network and a second network of different network types by using a same control channel protocol. When the controller obtains a path determining requirement for the data transmission path, because the controller has the network topology information of the first network and the second network, during computation of the data transmission path, the controller can determine a path computation result including transmission path parts of the first network and the second network, without performing additional information exchange with another device, and send the path computation result to the first network device. In this way, planning efficiency of the data transmission path is improved.

Network Architecture of the Present Invention

The embodiments of the present invention may be applied to a hybrid network including one controller for implementing a control function. The hybrid network in the embodiments of the present invention may include two networks of different network types. In the hybrid network, a controller is separately connected to a network device in a first network and a network device in a second network, and implements control over the network devices in the two networks. The controller may be a path computation element (PCE). The first network and the second network are two networks of different types in the hybrid network. Specifically, the first network and the second network may include an IP network, the Ethernet, a synchronous digital hierarchy (SDH) network, an asynchronous transfer mode (ATM) network, an automatically switched optical network (ASON), and the like. When the first network is an IP network, the Interior Gateway Protocol (IGP) may be deployed in the first network, the network device in the first network may be a router, and the controller may be an IP PCE. When the second network is an optical network, the network device in the second network may be a wavelength multiplexing device. In some optional application scenarios of the present invention, the first network may be an IP network, and the second network may be an optical network, for example, in an application scenario shown in FIG. 1. In an example of the scenario shown in FIG. 1, R1 to R4 may be network devices (for example, routers) in the IP network (the first network), T1 to T5 in a dashed-line box may be network devices (for example, wavelength division multiplexing devices) in the optical network (the second network), a PCE may be one controller in the IP network and the optical network, and the PCE may be further connected to a network orchestration and management system such as NetMatrix.

Method Embodiments of the Present Invention

Figure 2:
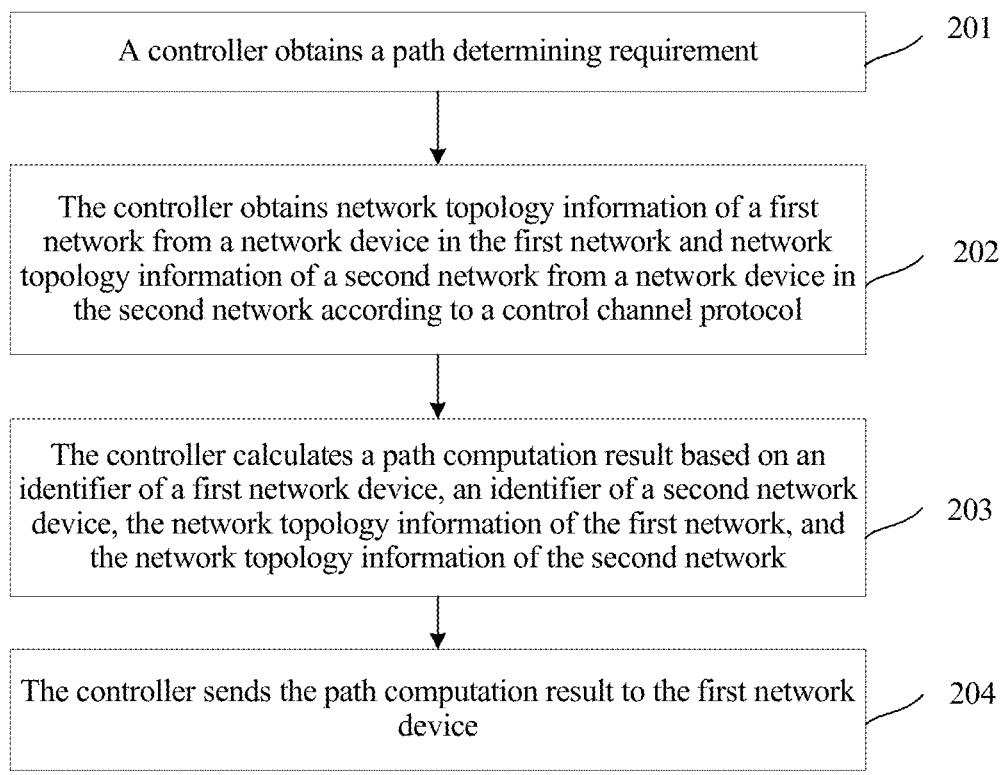
FIG. 2 is a flowchart of a path determining method according to an embodiment of the present invention.

FIG. 2 is a flowchart of a path determining method according to an embodiment of the present invention. The method includes the following steps.

201. A controller obtains a path determining requirement, where the path determining requirement is used to request to determine a data transmission path from a first network device to a second network device that includes a transmission path part in a first network and a transmission path part in a second network, the path determining requirement includes an identifier of the first network device and an identifier of the second network device, and both the first network device and the second network device are network devices in the first network. For example, in the scenario shown in FIG. 1, R1 may be the first network device, and R4 may be the second network device.

In an example of description, how the controller obtains the path determining requirement is not limited in the present invention. For example, the path determining requirement may be sent by any network device in the first network or the second network, for example, the first network device; or the path determining requirement may be sent by a third-party application server to the controller; or the path determining requirement may be generated by directly configuring an input requirement in the controller. A type of a network device is related to a network type of a network in which the network device is located. If a network type of the first network is an IP network, the first network device may be a router related to the IP network. The path determining requirement may include the identifier of the first network device that is used to identify the first network device, and the identifier of the first network device may be an ID of the first network device. The path determining requirement may further include the identifier of the second network device that is used to identify the second network device, and the identifier of the second network device may be an ID of the second network device.

A path establishment sequence or a direction of data transmission in a path may be used as a basis for determining a path starting point and a path termination point of a data transmission path. In this embodiment of the present invention, after a path computation result is determined through calculation based on the path determining requirement, the data transmission path may be established from the first network device to the second network device based on the path computation result, to complete establishment of the data transmission path.

Because both the first network device and the second network device are network devices in the first network, a part of the data transmission path is located in the second network, and the data transmission path includes the transmission path part in the first network and the transmission path part in the second network, a data transmission process in the data transmission path may be understood as a process that starts from the first network and then is performed in the second network before being performed in the first network again.

201a. The controller obtains network topology information of the first network from a network device in the first network and network topology information of the second network from a network device in the second network according to a control channel protocol.

It should be noted that numerical numbers of steps are not used as a basis for limiting a sequence of performing the steps in the present invention. In this method procedure, a sequence of performing 201 and 201a is not limited. The controller may start to obtain the network topology information of the first network and the network topology information of the second network after obtaining the path determining requirement; or the controller may obtain the network topology information of the first network and the network topology information of the second network in advance before obtaining the path determining requirement. The network topology information herein may include information about the network device in the first network, information about a link between the network device in the first network and a neighboring network device, and the like.

A same control channel protocol needs to be deployed between one controller and a network device in the first network and between the controller and a network device in the second network, so that the controller can obtain network topology information of at least two networks of different network types. The control channel protocol specifically needs to be deployed between the controller and which network device in the first network is not limited in the present invention, and the control channel protocol may be deployed between the controller and a network device that needs to upload the network topology information of the first network in the first network. The control channel protocol may be deployed between the controller and a network device that needs to upload the network topology information of the second network in the second network. Through deployment of the control channel protocol, the controller can not only obtain the network topology information of the first network but also the network topology information of the second network by using the control channel protocol.

202. The controller calculates a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network.

In an example of description, because the controller has obtained the network topology information of the first network and the second network, the controller may determine a specific location of the first network device in the first network based on the identifier of the first network device, and determine a specific location of the second network device in the second network based on the identifier of the second network device. The controller may further determine information about a network topology between the first network device and the second network device, and the like. The controller can independently calculate, based on the information determined above, the path computation result that includes the transmission path part in the first network and the transmission path part in the second network, without performing additional information exchange with another controller. In a process of calculating the path computation result, the controller may independently plan a feasible path based on the obtained network topology information of the first network and the second network, or may compute a path based on pre-planning data.

203. The controller sends the path computation result to the first network device.

Because the first network device is a network device that serves as a starting point of the data transmission path, the controller may send the path computation result to the first network device, so that the first network device starts to establish the data transmission path based on the path computation result.

By using a specific application scenario, the following further describes the embodiment corresponding to FIG. 2. Optionally, the specific application scenario shown in FIG. 1 is a scenario in which a path is determined through manual pre-planning. Numerals in brackets in FIG. 1 may be used to identify a sequence of performing steps in the path determining process.

In step 0, one controller, namely, a PCE obtains network topology information of an IP network and network topology information of an optical network.

In step 1, a user performs network planning and design manually or by using an offline planning tool. Planning data is verified, converted, and imported into NetMatrix, and the planning data includes a virtual traffic engineering link (Virtual TE Link, VTE Link) 14 from R1 to R4. In other words, a possible virtual data transmission path between R1 and R4 is determined through pre-planning.

In step 2, NetMatrix delivers the planning data to the PCE. The planning data includes an identifier of R1 as a starting end of the VTE link 14, an identifier of R4 as a termination end of the VTE link 14, an identifier of the VTE link 14, path information of the VTE link 14 in the IP network, and path information of the VTE link 14 in the optical network.

In step 3, R1 may send a path determining requirement to the PCE by using a PCEP protocol message. The path determining requirement may include the identifier of the VTE link 14 in addition to the identifier of R1 and the identifier of R4. Further, R1 takes permission to control a tunnel between R1 and T2 over to the PCE, so that the PCE can freely plan and determine a specific direction of the data transmission path.

After obtaining the path determining requirement sent by R1, the PCE obtains the planning data through matching based on the identifier of R1, the identifier of R4, and the identifier of the VTE link 14.

The PCE computes a data transmission path for the VTE link 14 based on the planning data, the network topology information of the IP network, and the network topology information of the optical network. Because the PCE has the network topology information of the IP network and the network topology information of the optical network, the PCE may independently complete a partial topology of the data transmission path in the IP network and the optical network. In FIG. 1, the partial topology of the data transmission path in the IP network and the optical network may be understood as a complete data transmission path, and a format of the data transmission path is <R1→T2, T2→T3, T3→T5, T5→R4>.

In step 4, the PCE delivers a path computation result that includes the partial topology of the data transmission path in the IP network and the optical network to R1.

In a conventional manner, because the PCE does not have the network topology information of the optical network, the PCE can obtain a computation result of a transmission path part of the data transmission path in the optical network from a controller of the optical network only through a plurality of times of data exchange, causing quite low planning efficiency of the data transmission path. In addition, because the PCE cannot identify a topology in the optical network, a data transmission path format finally obtained by the PCE is <R1→T2, PATH-KEY, T5→R4>, and a computation result of the transmission path part in the optical network is encrypted and hidden in a form of PATH-KEY. It should be further noted that, because the path computation result received by R1 includes the encrypted and hidden PATH-KEY part, in a process of establishing the data transmission path based on the path computation result, a network device (for example, T2) in the optical network further needs to request an optical PCE to parse the encrypted and hidden PATH-KEY part. Such additional data exchange that is added is equivalent to further impact on establishment efficiency of the data transmission path that is caused by a previous data transmission path determining result.

In the scenario shown in FIG. 1, the data transmission path computed by the PCE is a complete data transmission path, and does not include the encrypted and hidden part in the conventional manner, and the PCE does not need to perform data exchange with another controller either during computation. In addition, because the computation result of the transmission path part in the optical network is directly displayed, in the process of establishing the data transmission path, additional information exchange between T2 and an optical controller in the conventional manner is avoided, thereby improving establishment efficiency of the data transmission path.

It can be learned that in a hybrid network, the controller may separately obtain the network topology information of the first network and the second network of different network types by using a same control channel protocol. When the controller obtains a path determining requirement for the data transmission path, because the controller has the network topology information of the first network and the second network, during computation of the data transmission path, the controller can determine the path computation result including the transmission path parts of the first network and the second network, without performing additional information exchange with another device, and send the path computation result to the first network device. In this way, planning efficiency of the data transmission path is improved.

In an optional case in which the control channel protocol is the Path Computation Element Communication Protocol (PCEP), the following describes how the controller sends the path computation result to the first network device. Currently, in the conventional PCEP, basically a controller can send, to a network device, only a computation result of a transmission path part, in a path computation result, in a network (for example, an IP network) in which the network device is located, but the controller cannot send a computation result of a transmission path part, in the path computation result, in another network to the network device. The original PCEP needs to be improved or extended, to carry the path computation result by using the PCEP message, so that the controller can send the path computation result to the first network device in the PCEP. In this embodiment of the present invention, the PCEP message may include a PCEP-reply message or a PCEP-update message. A type value of a message type of the PCEP-reply message may be set to 4, and a message name (Message Name) of the PCEP-reply message may be Path Computation Reply. A type value of a message type of the PCEP-update message may be set to 11, and a message name of the PCEP-update message may be Update.

In the PCEP message that carries the path computation result and that is sent by the controller to the first network device, the PCEP message includes path information fields, the path information fields are used to carry interface information of network devices through which the data transmission path successively passes, and the interface information includes egress interface information or ingress interface information of the network devices. A sequence of arranging the interface information carried in the path information fields is consistent with a transmission sequence of the data transmission path. The egress interface information or the ingress interface information of the network devices may be understood as egress interface information or ingress interface information of a link, in the data transmission path, on the network devices. One path information field may be used to carry one piece of interface information.

A format of the path information field is related to a type of a network device in which an interface is located. If one path information field carries interface information of an interface of one link on one network device in an IP network, the path information field may include an IP address of the network device, and the IP address may be specifically an IPv4 address or an IPv6 address. If one path information field carries interface information of an interface of one link on one network device in an optical network, the path information field may include a device identifier of the network device and an identifier of an interface that is on the network device and that is related to the link.

The scenario shown in FIG. 1 is used as an example. The path computation result includes four links included in the data transmission path. The four links are respectively R1→T2, T2→T3, T3→T5, and T5→R4 according to the transmission sequence of the data transmission path. Correspondingly, the transmission sequence is also used as a basis for the interface information separately carried in the plurality of path information fields in the PCEP message. In the process of establishing the data transmission path, when the first network device receives the PCEP message that carries the interface information, the first network device may determine how to start to establish the data transmission path, and another network device in the data transmission path determines how to continue and complete establishment of the data transmission path.

In this embodiment of the present invention, a quantity of pieces of interface information carried in the PCEP message or a type of the interface information (for example, an egress interface or an ingress interface on a network device) is not limited, provided that the network device can be instructed to complete a function of establishing the data transmission path. To implement the function, optionally, for one link in the data transmission path, the PCEP message carries at least interface information of at least one of an egress interface and an ingress interface of the link on the network device by using the path information field.

The scenario shown in FIG. 1 is used as an example. The four links in the data transmission path are respectively R1→T2, T2→T3, T3→T5, and T5→R4 according to the transmission sequence. The link R1→T2 is used as an example. R1→T2 has two interfaces. According to a transmission direction of the link, an interface of R1→T2 on R1 is an egress interface, and an interface of R1→T2 on T2 is an ingress interface. The PCEP message may carry interface information of one of the two interfaces of R1→T2, or the PCEP message carries interface information of the two interfaces of R1→T2. In a packet structure of the PCEP message, a sequence of the interface information carried in the path information fields is arranged based on the transmission sequence of the data transmission path, and information about an interface closer to a starting point (R1) of the data transmission path is carried in a path information field closer to a packet header.

For example, to ensure integrity, the PCEP message sent to the first network device may carry interface information of a total of eight interfaces of the four links, and the packet structure of the PCEP message includes eight path information fields correspondingly. According to a reading sequence, a first path information field closest to the packet header carries interface information of the egress interface of R1→T2 on R1, and the first path information field includes an IP address of R1 because R1 is a network device in the IP network; a second path information field carries interface information of the ingress interface of R1→T2 on T2, and because T2 is a network device in the optical network, the second path information field includes a device identifier of T2 and an interface identifier of the interface (the ingress interface) used by T2 to establish R1→T2; and a third path information field carries interface information of an egress interface of T2→T3 on T2, and because T2 is a network device in the optical network, the third path information field includes the device identifier of T2 and an interface identifier of the interface (the egress interface) used by T2 to establish T2→T3. The same is true of content carried in a fourth path information field to an eighth path information field, and details are not described one by one.

For example, alternatively, the PCEP message may carry only interface information of egress interfaces of the four links on network devices, or may carry only interface information of ingress interfaces of the four links on network devices, or may carry another possible combination of interface information, and details are not described one by one.

Figure 3:
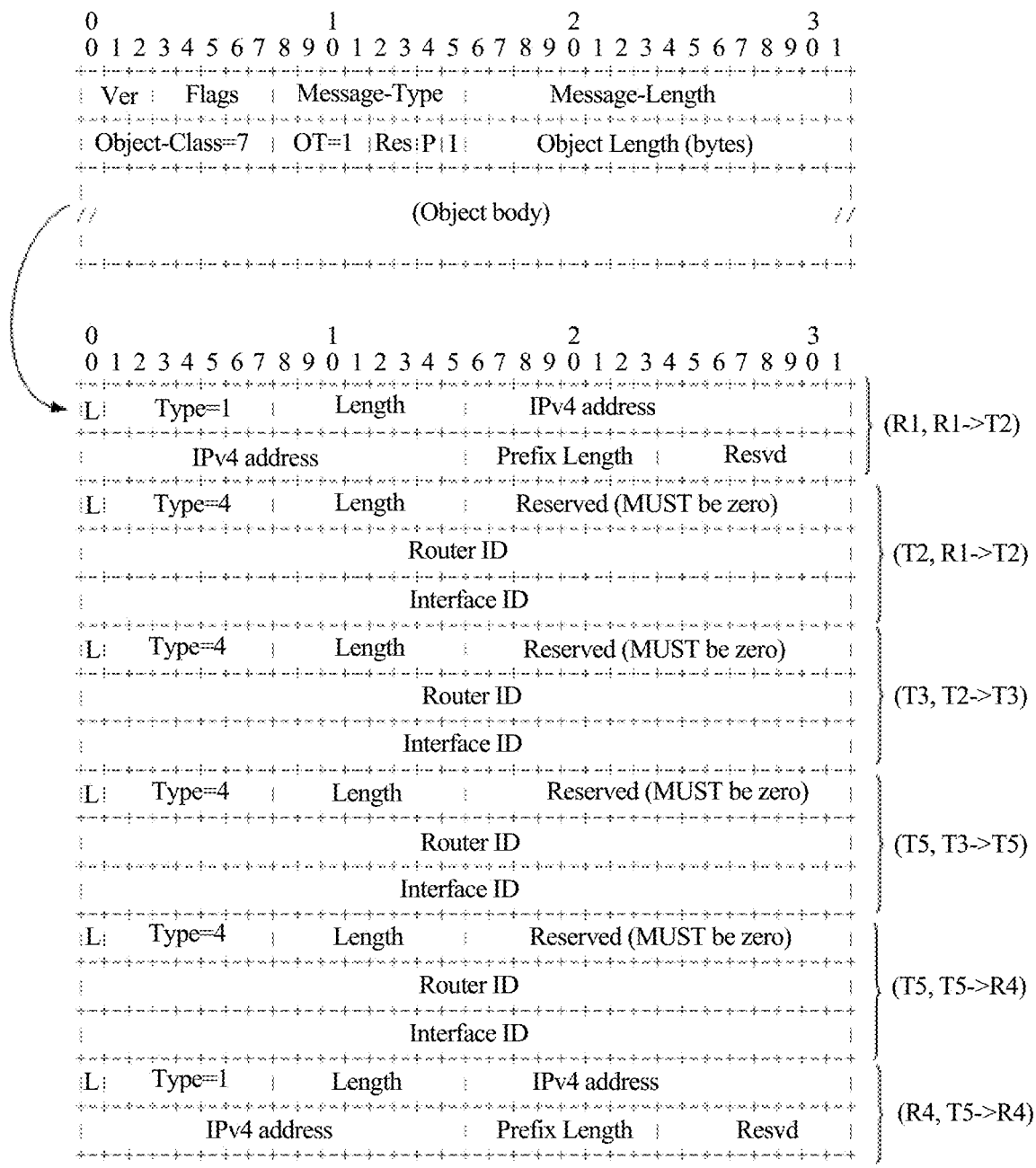
FIG. 3 is a schematic diagram of a packet format of a PCEP message according to an embodiment of the present invention.

A possible combination of interface information in the scenario shown in FIG. 1 is used as an example herein. FIG. 3 shows a possible packet structure of a PCEP message. An object body includes six path information fields, a sequence of arranging interface information carried in the six path information fields is consistent with the data transmission sequence of the data transmission path, and the carried interface information is successively (R1, R1→T2), (T2, R1→T2), (T3, T2→T3), (T5, T3→T5), (T5, T5→R4), and (R4, T5→R4). It can be learned that in the embodiment corresponding to FIG. 3, for the link R1→T2, the PCEP message not only carries the interface information of the egress interface of the link on R1, but also carries the interface information of the ingress interface of the link on T2; for the links T2→T3 and T3→T5, the PCEP message carries only interface information of ingress interfaces of the links on T3 and T5; and for the link T5→R4, the PCEP message not only carries interface information of an egress interface of the link on T5, but also carries interface information of an ingress interface of the link on R4.

For the interface information (R1, R1→T2), because R1 is a network device in the IP network, a path information field carrying (R1, R1→T2) includes an IPv4 address of R1. A length of the IPv4 address may be 4 bytes (unit: byte), and the interface information may also be used to identify an interface identifier of the interface (the egress interface) used by R1 to establish R1→T2. As shown in FIG. 3, the IPv4 address is carried in an upper right part and a lower left part of the path information field. It should be noted that the IPv4 address of R1 may be replaced with an IPv6 address of R1 based on a type of the first network, namely, the IP network.

For the interface information (T2, R1→T2), because T2 is a network device in the optical network, a path information field carrying (T2, R1→T2) includes the device identifier (Router ID) of T2 and the interface identifier (Interface ID) of the interface (the ingress interface) used by T2 to establish R1→T2. The interface identifier may occupy 32 bits (unit: bit).

For the interface information (T3, T2→T3), because T3 is a network device in the optical network, a path information field carrying (T3, T2→T3) includes a device identifier of T3 and an interface identifier of an interface (an ingress interface) used by T3 to establish T2→T3. The interface identifier may occupy 32 bits.

For the interface information (T5, T3→T5), because T5 is a network device in the optical network, a path information field carrying (T5, T3→T5) includes a device identifier of T5 and an interface identifier of an interface (an ingress interface) used by T5 to establish T3→T5. The interface identifier may occupy 32 bits.

For the interface information (T5, T5→R4), because T5 is a network device in the optical network, a path information field carrying (T5, T5→R4) includes the device identifier of T5 and an interface identifier of the interface (the egress interface) used by T5 to establish T5→R4. The interface identifier may occupy 32 bits.

For the interface information (R4, T5→R4), because R4 is a network device in the IP network, a path information field carrying (R4, T5→R4) includes an IPv4 address of R4. A length of the IPv4 address may be 4 bytes, and the interface information may also be used to identify an interface identifier of the interface (the ingress interface) used by R4 to establish T5→R4. As shown in FIG. 3, the IPv4 address is carried in an upper right part and a lower left part of the path information field. It should be noted that the IPv4 address of R4 may be replaced with an IPv6 address of R4 based on the type of the first network, namely, the IP network.

It can be learned that, through the improvement, the controller can not only add, to the PCEP message, the computation result of the transmission path part in the path computation result in the first network (the IP network), but also add, to the PCEP message, content that originally cannot be carried, to be specific, the computation result of the transmission path part in the path computation result in the second network (the optical network). Therefore, the PCEP message can carry the path computation result that includes the transmission path parts of the two networks of different types (the IP network and the optical network), and the path computation result can be sent to one network device, thereby improving planning efficiency of the data transmission path.

In an optional case in which the control channel protocol is the PCEP, the following describes how one controller obtains network topology information of at least two types of networks. Currently, in the conventional PCEP, basically one controller can obtain network topology information of one type of network (for example, an IP network), but the controller cannot obtain network topology information of at least two types of networks. Therefore, in this embodiment of the present invention, the conventional PCEP is improved or extended, so that a network device in a different type of network (for example, an optical network) can use a Path Computation Element Communication Protocol link state (PCEP-LS) message to carry network topology information of the network in which the network device is located. For example, in a hybrid network scenario in which the first network is an IP network and the second network is an optical network, the controller obtains the network topology information of the second network, namely, the optical network based on a PCEP-LS message sent by a network device in the second network. In this way, one controller can obtain network topology information of two types of networks (the IP network and the optical network) in the PCEP.

The following specifically describes how to use the PCEP-LS message to carry the network topology information of the second network.

A corresponding identifier needs to be added to the PCEP-LS message, so that the controller can determine that received network topology information is the network topology information of the second network. Optionally, the controller obtains the network topology information of the second network based on the PCEP-LS message sent by the network device in the second network, and a universal routing field (Routing Universe TLV) in the PCEP-LS message identifies the second network by using a value. The value herein may be carried in a flag bit (Identifier) field in the universal routing field, and the value may be specifically set to "1", to identify the second network, to be specific, an optical layer topology (layer 0 Routing topology). In the conventional manner, in a PCEP-LS message sent by a network device in the first network to the controller, a value "0" in a flag bit field in a universal routing field may be used to identify the first network. Therefore, when receiving a PCEP-LS message, the controller may determine, by using a value (for example, 0 or 1) in a flag bit field in a universal routing field, whether network topology information carried in the PCEP-LS message belongs to the first network or the second network. For usage of the universal routing field, refer to FIG. 4 in which "Identifier=1" is used to identify the second network.

In addition, the network topology information of the second network may include node information of the network device in the second network and link information of the network device in the second network. When the network device in the second network uploads the network topology information to the controller by using the PCEP- LS message, the node information and the link information need to be carried by using corresponding descriptors.

How to use the PCEP-LS message to carry the node information of the network device in the second network is first described. Before the description, a relationship between the network device and the node needs to be clarified. The node may belong to a definition at a logical level, and may be used to represent a network device. For example, one network device may be considered as one node or one network node at the logical level. In other words, the node may be understood as a name or a representation form of the network device at the logical level.

Optionally, to enable the PCEP-LS message to carry the node information of the network device in the second network, the PCEP-LS message further includes a node object used to identify the network device in the second network. The node object includes a descriptor (Local Node Descriptor TLV) of the network device in the second network, and the descriptor of the network device in the second network is used to carry an identifier and an attribute of the network device in the second network. For a packet format that is of the PCEP-LS message and that is used to carry the node information of the network device in the second network, refer to FIG. 4. The node object is one of object types (OT), and a type value of a corresponding object type may be 1, for example, "OT=1" shown in FIG. 4. A device identifier of a network device in the second network may be carried in an optical node identifier field (Optical Node-ID sub-TLV) in a local node descriptor.

When the second network is an optical network, in some scenarios, during uploading of the node information, some attributes, such as some specific information, of a network device in the optical network may further need to be uploaded. Therefore, in addition to the packet structure shown in FIG. 4, to carry the specific information of the network device in the optical network, some fields such as a resource block information field, a resource accessibility field, a resource wavelength constraints field, a resource block pool state field, and a resource block shared access wavelength availability field may be added to the local node descriptor. These fields may be in a sub-TLV format.

For the resource block information field, because hardware components such as a regenerator and a wavelength converter are referred to as resources in a wavelength switched optical network (WSON), a resource block is a set of resources on one wavelength switched optical network node. The resource block information field is used to carry attribute information of a resource block.

The resource accessibility field may be used to carry information that describes a capability of accessing a resource block by an ingress port and information about a capability of accessing an egress port by a resource block.

The resource wavelength constraints field may be used to carry range information of a wavelength that can be accepted by a resource.

The resource block pool state field may carry state information of a resource block.

The resource block shared access wavelength availability field may be used to carry availability information of a resource block when the resource block is to be accessed by using a shared fiber.

How to use the PCEP-LS message to carry information about a link between network devices in the second network is then described. Optionally, the PCEP-LS message further includes a link object used to identify the network device in the second network. The link object is one of object types, and a type value of a corresponding object type may be 2, for example, "OT=2" shown in FIG. 5 and FIG. 6. The link object includes a link descriptor (Link Descriptor TLV), the link descriptor is used to carry link information of a link between a network device in the second network and a neighboring network device, and the link descriptor includes a descriptor (Local Node Descriptor TLV) of the network device in the second network, a descriptor (Remote Node Descriptor TLV) of the neighboring network device, and a link identifier field (Link Local/Remote ID sub-TLV). The link identifier field is used to carry interface information of the network device in the second network and interface information of the neighboring network device on the link between the network device in the second network and the neighboring network device.

A neighboring network device of a network device may be understood as another network device that has a link with the network device. A neighboring network device of a network device in the second network may include a network device in the second network, and may also include a network device in the first network.

For link information of a link between a network device in the second network and a neighboring network device, a local node descriptor and a remote node descriptor are respectively used to carry local node information and remote node information of the link, and a link identifier field is used to carry a local identifier (Link Local Identifier) and a remote identifier (Link Remote Identifier) of the link. Data transmission on the link is directional, for example, in the scenario shown in FIG. 1, a data transmission direction of the link R1→T2 is from R1 to T2. Therefore, for a link that connects a network device a and a network device b, if a data transmission direction is from the network device a to the network device b, a local node of the link may be the network device a, and a remote node may be the network device b. A local identifier of the link may be used to identify an interface used to establish the link on the network device a, and a remote identifier may be used to identify an interface used to establish the link on the network device b. Because information about a link between network devices in the second network is carried by using the PCEP-LS message, the local node is a network device in the second network, and the remote node is a neighboring network device.

A network device in the second network may have a link with another network device in the second network, and may also have a link with a network device in the first network. Therefore, when link information of the two different links is carried in PCEP-LS messages, there may be a specific difference between packet formats of the PCEP-LS messages. With reference to the scenario shown in FIG. 1, the following describes a packet format that may be used to carry link information in a PCEP-LS message.

Figure 4:
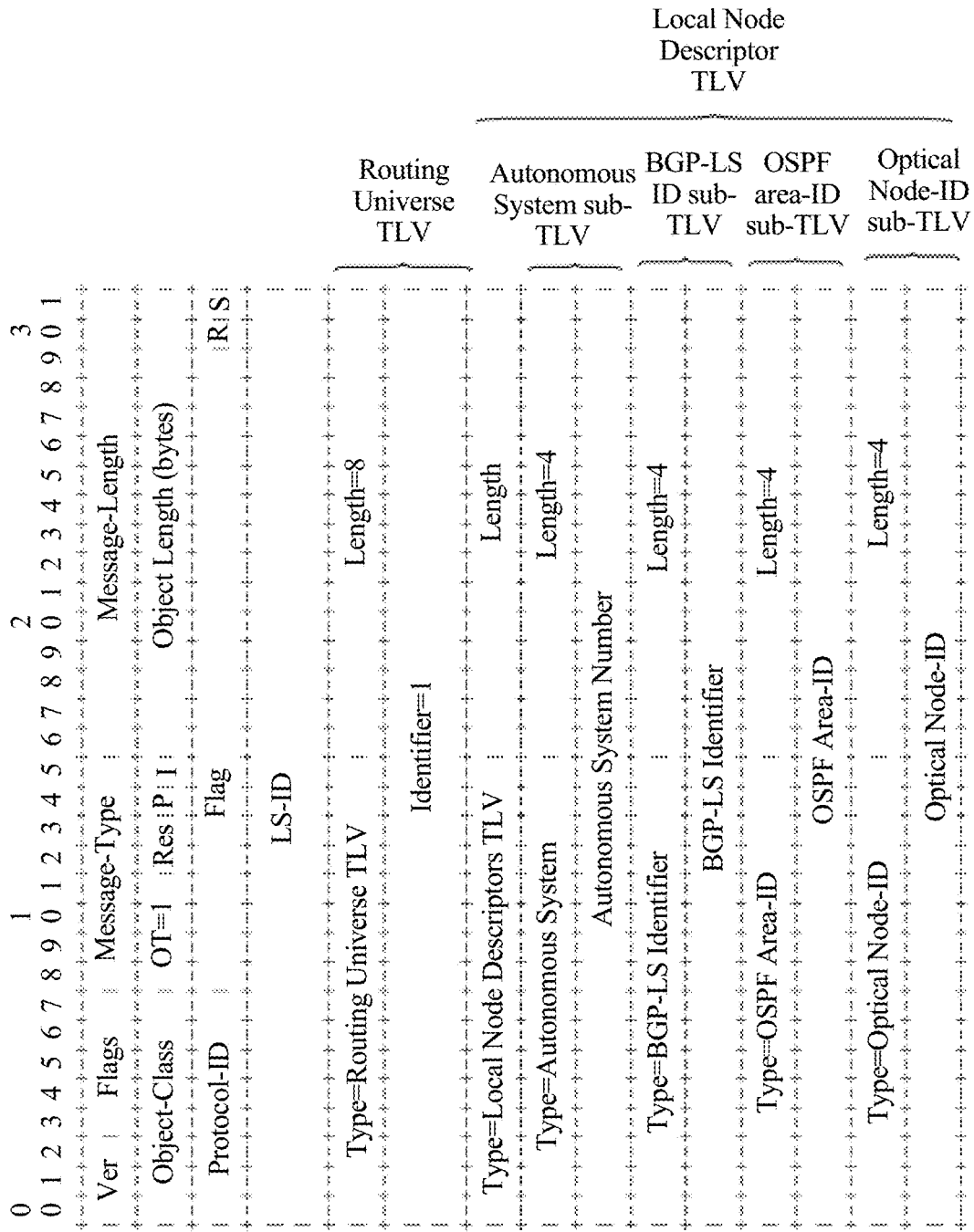
FIG. 4 is a schematic diagram of a packet format used to carry node information in a PCEP-LS message according to an embodiment of the present invention.
Figure 5:
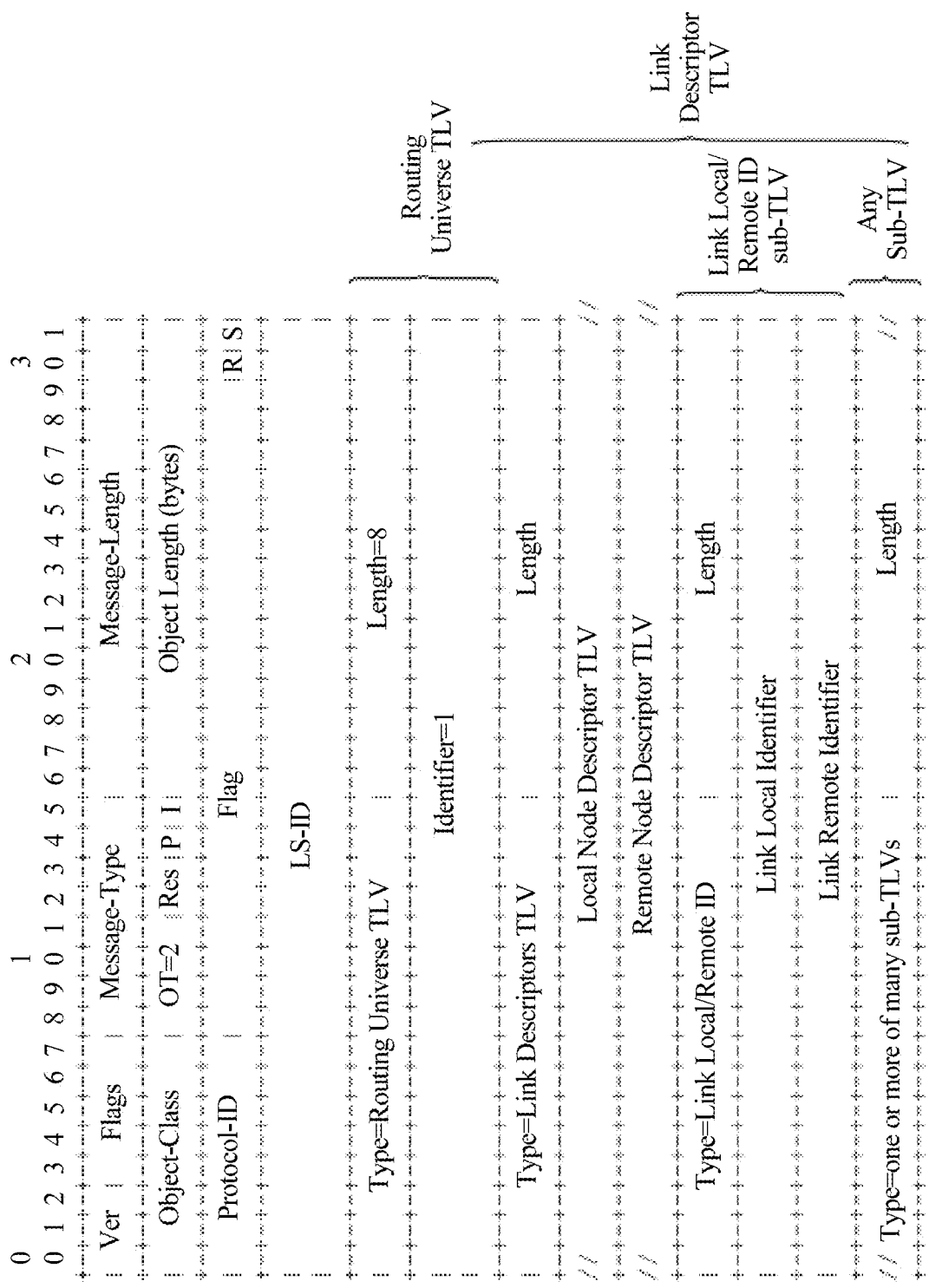
FIG. 5 is a schematic diagram of a packet format used to carry link information in a PCEP-LS message according to an embodiment of the present invention.

When the neighboring network device is a network device in the second network, in an example of link information of the link T2→T3, for a packet format for carrying the link information in a PCEP-LS message, refer to FIG. 5. For packet formats of a local node descriptor and a remote node descriptor, refer to FIG. 4, and details are not described herein again.

In FIG. 5, the local node descriptor may carry node information of T2, the remote node descriptor may carry node information of T3, a local identifier field in a link identifier field may carry related information about an interface used by T2 to establish T2→T3, and a remote identifier field in the link identifier field may carry related information about an interface used by T3 to establish T2→T3. A field "Any Sub-TLV" shown in FIG. 5 may be another TLV field that may be defined in a link descriptor. If other related information further needs to be carried for T2→T3, a corresponding field may be selected from the another TLV field and placed at a location of the field "Any Sub-TLV". For example, an interface switching capability descriptor (Interface Switching Capability Descriptor sub-TLV) is another TLV field that can be used to replace the field "Any Sub-TLV", and the interface switching capability descriptor may be used to carry related information about switching capabilities of different interfaces.

Figure 6:
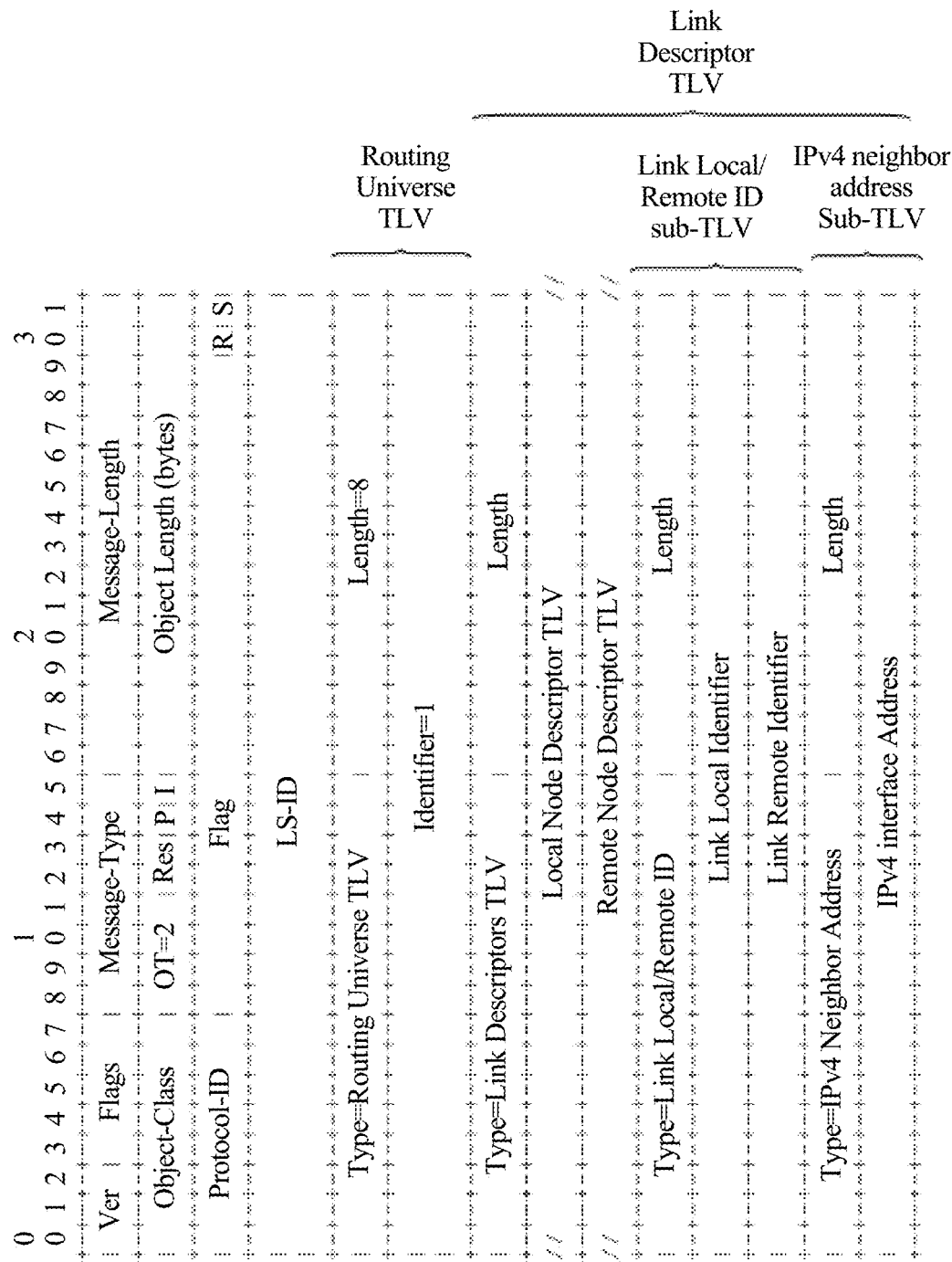
FIG. 6 is a schematic diagram of a packet format used to carry link information in a PCEP-LS message according to an embodiment of the present invention.

When the neighboring network device is a network device in the first network, in an example of link information of the link T5→R4, for a packet format for carrying the link information in a PCEP-LS message, refer to FIG. 6. For packet formats of a local node descriptor and a remote node descriptor, refer to FIG. 4, and details are not described herein again.

In FIG. 6, the local node descriptor may carry node information of T5, the remote node descriptor may carry node information of T3, a local identifier field in a link identifier field may carry related information about an interface used by T5 to establish T5→R4, and a remote identifier field in the link identifier field may carry related information about an interface used by R4 to establish T5→R4. Because one end of the link T5→R4 is connected to a network device (R4) in the first network (the IP network), an IP neighbor address field (IPv4 neighbor address sub-TLV) may be used to carry an IPv4 address of R4. It should be noted that the IPv4 address of R4 may be replaced with an IPv6 address of R4 based on the type of the first network, namely, the IP network, another IP neighbor address field (IPv6 neighbor address sub-TLV) is used to carry the IPv6 address of R4, and a length (Length) of the IP neighbor address field may be 16 bytes.

From the perspective of a network device, the following describes how to upload network topology information to the controller by using a PCEP-LS message. This embodiment of the present invention provides at least two manners of carrying network topology information by using a PCEP-LS message. The following describes two main manners of carrying network topology information with reference to a specific scenario. In the specific scenario, the first network is an IP network, and the second network is an optical network. In a process of uploading network topology information, how a network device in the IP network sends network topology information of the IP network to the controller by using a PCEP-LS message is unlimited in the present invention. Therefore, the following mainly provides descriptions for a network device in the second network.

In a first manner, the PCEP may be deployed between each network device in the second network and the controller, and each network device may send topology sub-information of the network device, that is, a part of network topology information of the second network to the controller. The controller may combine all pieces of received topology sub-information, to obtain the network topology information of the second network. The first manner is usually implemented when a protocol (for example, a conventional IGP protocol) used to diffuse network topology information between network devices in the second network is not deployed, because in this case, each network device in the second network does not independently learn the network topology information of the entire second network, but only determines topology sub-information of the network device based on a neighbor relationship.

Topology sub-information of a network device may include node information of the network device and link information of a link between the network device and a neighboring network device. A target network device that is any network device in the second network is used as an example. Topology sub-information of the target network device includes node information of the target network device and link information of a link between the target network device and a neighboring network device. When the target network device sends, to the controller, a PCEP-LS message that carries the network topology information of the second network, the PCEP-LS message carries the topology sub-information of the target network device. Correspondingly, another network device in the second network may also send topology sub-information of the another network device to the controller by using a PCEP-LS message, where the PCEP is deployed between the another network device and the controller. In the scenario shown in FIG. 1, if the target network device is T2, topology sub-information of T2 in the second network may include node information of T2, link information of T2→R1, link information of T2→T1, and link information of T2→T3.

When the target network device sends the topology sub-information of the target network device to the controller, node information in the topology sub-information may be carried in the packet format of the local node descriptor shown in FIG. 4. When there are a plurality of links between the target network device and neighboring network devices, link information of any link may be carried in the packet format of the link descriptor shown in FIG. 5 or FIG. 6. A plurality of link descriptors that carry a plurality of pieces of link information may be set in one PCEP-LS message, or may be set in a plurality of PCEP-LS messages (for example, when there are an excessively large quantity of pieces of link information or there is an extremely large data volume).

In a second manner, a protocol used to diffuse network topology information is deployed between network devices in the second network. In this case, the network topology information of the second network may be diffused between the network devices in the second network, so that a target network device has collected the network topology information of the second network during diffusion. When the target network device sends, to the controller, a PCEP-LS message that carries the network topology information of the second network, the target network device may directly send the network topology information of the second network to the controller. In other words, in the second manner, the PCEP only needs to be deployed between the controller and the target network device, so that the controller can obtain the network topology information of the second network. In the scenario shown in FIG. 1, the network topology information of the second network may include node information of T1 to T5, and link information of links between T1 to T5 and neighboring network devices.

When the target network device sends the network topology information of the second network to the controller, node information of any node in the network topology information may be carried in the packet format of the local node descriptor shown in FIG. 4, and link information of any link may be carried in the packet format of the link descriptor shown in FIG. 5 or FIG. 6. A plurality of local node descriptors that carry a plurality of pieces of node information may be set in one PCEP-LS message, or may be set in a plurality of PCEP-LS messages. A plurality of link descriptors that carry a plurality of pieces of link information may be set in one PCEP-LS message, or may be set in a plurality of PCEP-LS messages.

Therefore, network topology information may be uploaded, by using a PCEP-LS message, to the controller according to different requirements or according to a manner that is selected for different application scenarios, so that flexibility of uploading the network topology information is improved, and the network topology information is uploaded more widely.

After the controller sends the path computation result to the first network device, the first network device may start to establish the data transmission path.

It should be noted that, in this embodiment of the present invention, the path computation result that may be determined by the controller includes the computation result of the transmission path part of the data transmission path in the second network. In other words, in comparison with the conventional manner, the transmission path part of the data transmission path in the second network has been determined in the path computation result. When the network device establishes the data transmission path based on the path computation result, a network device in the second network can directly establish the path based on information in the path computation result without requesting to obtain the computation result of the transmission path part of the data transmission path in the second network from another controller.

In a process of establishing a data transmission path in the conventional manner, when a network device at a specified location in the second network receives a path computation result, a transmission path part of a data transmission path in the second network in the path computation result cannot be directly identified because the transmission path part is in an encrypted state, and the network device at the specified location needs to request another controller (for example, a controller of the second network) to perform decryption. The network device can continue to establish the data transmission path in the second network only after receiving a decryption result.

The network device at the specified location is located at a location that is in the second network and that is adjacent to the first network. According to the transmission sequence of the data transmission path, a previous network device of the network device at the specified location in the data transmission path is a network device in the first network. FIG. 1 is used as an example. In the transmission sequence of the data transmission path, a previous network device of T2 in the data transmission path is the network device R1 in the first network, and therefore the network device at the specified location may be T2.

If the target network device is the network device at the specified location, in this embodiment of the present invention, when the target network device obtains the computation result of the transmission path part of the data transmission path in the second network from a previous network device, the computation result may be directly identified and is unencrypted. Therefore, the target network device may directly continue to establish the data transmission path based on the computation result of the transmission path part of the data transmission path in the second network. In this way, additional information exchange with an optical controller in the conventional manner is avoided, thereby improving establishment efficiency of the data transmission path. FIG. 1 is used as an example. When T2 receives the computation result of the transmission path part of the data transmission path in the second network from R1, T2 may directly determine, based on the computation result, that a path from T2 to T3 needs to be established.

In a scenario in which the first network is an IP network and the second network is an optical network, if the data transmission path is successfully established, a virtual link (namely, a VTE link) of a data transmission link between the first network device and the second network device in the IP network may be generated during establishment. The controller may consider the data transmission path as an IP link in the IP network based on the virtual link, and the IP link may be identified by using a destination IP address and a source IP address. The first network device may report related information about the established virtual link to the controller. In this embodiment of the present invention, the related information about the virtual link may be carried by using a PCEP-LS message.

Figure 7:
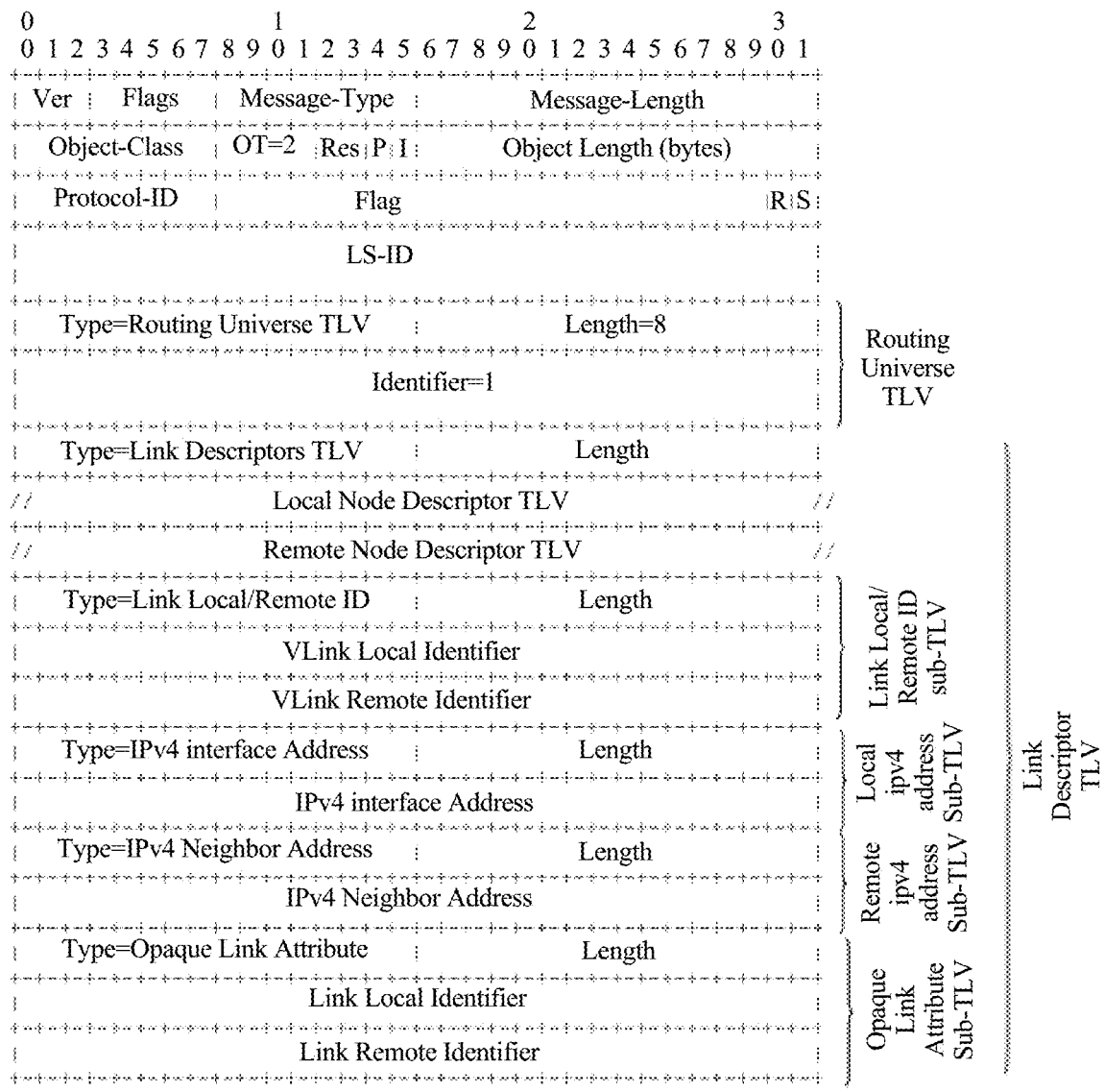
FIG. 7 is a schematic diagram of a packet format used to carry a VTE link part in a PCEP-LS message according to an embodiment of the present invention.

Optionally, as shown in FIG. 7, the controller receives a PCEP-LS message sent by the first network device. A universal routing field in the PCEP-LS message identifies the first network by using a value, a link object includes a link descriptor, and the link descriptor includes a local node descriptor, a remote node descriptor, a link identifier field, and an opaque link attribute field. The local node descriptor is used to carry local node information of a VTE link, namely, the identifier of the first network device. The remote node descriptor is used to carry remote node information of the VTE link, namely, the identifier of the second network device. Packet structures of the local node descriptor and the remote node descriptor have been described above, and therefore details are not described herein again.

The link identifier field (Link Local/Remote ID sub-TLV) in the link descriptor is used to carry a virtual local identifier (VLink Local Identifier) and a virtual remote identifier (VLink Remote Identifier) of the VTE link, and the opaque link attribute field (Opaque Link Attribute Sub-TLV) in the link descriptor is used to carry a local identifier and a remote identifier of the VTE link.

Because the first network device and the second network device are network devices in the IP network, an IP address of the first network device and that of the second network device may be further carried in the PCEP-LS message to further identify the VTE link. Optionally, as shown in FIG. 7, the link descriptor further includes a local IP address field and a remote IP address field, the local IP address field in the link descriptor is used to carry local interface information of the VTE link on the first network device (for example, the IP address of the first network device), and the remote IP address field in the link descriptor is used to carry remote interface information of the VTE link on the second network device (for example, the IP address of the second network device). It should be noted that, based on the type of the first network, namely, the IP network, an IPv4 address of the first network device and that of the second network device may be replaced with an IPv6 address of the first network device and that of the second network device.

Therefore, in this embodiment of the present invention, the first network device may further report information about the established VTE link to the controller by using the PCEP-LS message, so that the controller can quickly learn the related information about the established VTE link, and therefore the controller can accurately regulate, control, and manage the hybrid network.

Device Embodiments of the Present Invention

Figure 8:
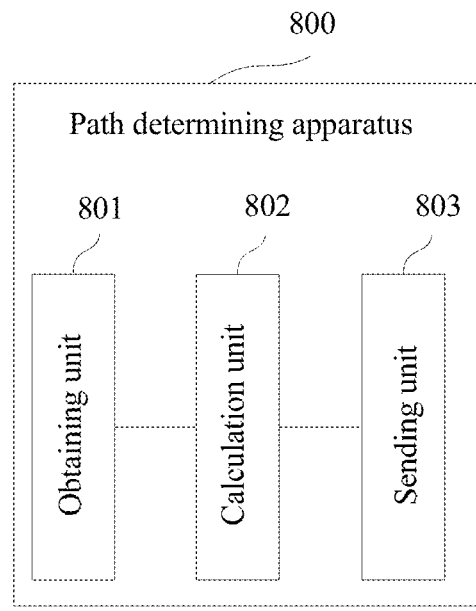
FIG. 8 is a structural diagram of a path determining apparatus according to an embodiment of the present invention.

FIG. 8 is a structural diagram of a path determining apparatus according to an embodiment of the present invention. The path determining apparatus 800 is applied to a hybrid network including one controller for implementing a control function, the hybrid network includes a first network and a second network, and the path determining apparatus 800 includes an obtaining unit 801, a calculation unit 802, and a sending unit 803.

The obtaining unit 801 is configured to obtain a path determining requirement, where the path determining requirement is used to request to determine a data transmission path from a first network device to a second network device that includes a transmission path part in the first network and a transmission path part in the second network, the path determining requirement includes an identifier of the first network device and an identifier of the second network device, and both the first network device and the second network device are network devices in the first network.

The obtaining unit 801 is further configured to obtain network topology information of the first network from a network device in the first network and network topology information of the second network from a network device in the second network according to a control channel protocol.

The calculation unit 802 is configured to calculate a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network.

The sending unit 803 is configured to send the path computation result to the first network device.

Optionally, the obtaining unit is further configured to obtain planning data of a virtual path, where the planning data includes the identifier of the first network device serving as a starting end of the virtual path, the identifier of the second network device serving as a termination end of the virtual path, an identifier of the virtual path, path information of the virtual path in the first network, and path information of the virtual path in the second network, and the path determining requirement obtained by the controller further includes the identifier of the virtual path.

The calculation unit is further configured to: perform matching on the planning data based on the identifier of the first network device, the identifier of the second network device, and the identifier of the virtual path; and compute the data transmission path for the virtual link based on the planning data, the network topology information of the first network, and the network topology information of the second network, and determine the path computation result.

The apparatus embodiment in the technical solutions of the present invention is described from the perspective of the controller in FIG. 8. For feature descriptions of the embodiment corresponding to FIG. 8, refer to related descriptions of the embodiment corresponding to FIG. 2. Details are not described herein again.

Optionally, the sending unit is specifically configured to send, to the first network device, a PCEP message that carries the path computation result, where the PCEP message includes path information fields, the path information fields are used to carry interface information of network devices through which the data transmission path successively passes, and the interface information includes egress interface information or ingress interface information of the network devices.

Optionally, for one link in the data transmission path, the PCEP message carries at least interface information of at least one of an egress interface and an ingress interface of the link on a network device by using the path information field.

Optionally, the PCEP message includes a PCEP-reply message or a PCEP-update message.

For descriptions of the PCEP message and a related packet format of the PCEP message, refer to related descriptions of the embodiment corresponding to FIG. 3. Details are not described herein again.

Optionally, the control channel protocol is the PCEP, and the obtaining unit is specifically configured to obtain the network topology information of the second network based on a PCEP-LS message sent by the network device in the second network, where a universal routing field in the PCEP-LS message identifies the second network by using a value.

Optionally, the PCEP-LS message further includes a node object used to identify the network device in the second network, the node object includes a descriptor of the network device in the second network, and the descriptor of the network device in the second network is used to carry an identifier and an attribute of the network device in the second network.

Optionally, the PCEP-LS message further includes a link object used to identify the network device in the second network;

the link object includes a link descriptor, and the link descriptor is used to carry link information of a link between the network device in the second network and a neighboring network device; and the link descriptor includes a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

Optionally, the first network is an Internet Protocol IP network, in the link object in the PCEP-LS message sent by the network device in the second network, the link descriptor further includes an IP neighbor address field, and the IP neighbor address field is used to carry an IP address of a network device that is in the first network and that is adjacent to the network device in the second network.

For descriptions of the PCEP-LS message and a related packet format of the PCEP-LS message, refer to related descriptions of the embodiments corresponding to FIG. 4, FIG. 5, and FIG. 6. Details are not described herein again.

Optionally, the first network is an IP network. The obtaining unit is further configured to receive a PCEP-LS message sent by the first network device, where a universal routing field in the PCEP-LS message identifies the first network by using a value, a link object includes a link descriptor, and the link descriptor includes a local node descriptor, a remote node descriptor, a link identifier field, and an opaque link attribute field; the local node descriptor and the remote node descriptor in the link descriptor are used to carry local node information and remote node information of a VTE link; and the link identifier field in the link descriptor is used to carry a virtual local identifier and a virtual remote identifier of the VTE link, the opaque link attribute field in the link descriptor is used to carry a local identifier and a remote identifier of the VTE link, and the VTE link is a virtual link of a data transmission link between the first network device and the second network device in the IP network.

Optionally, the link descriptor further includes a local IP address field and a remote IP address field, the local IP address field in the link descriptor is used to carry local interface information of the VTE link on the first network device, and the remote IP address field in the link descriptor is used to carry remote interface information of the VTE link on the second network device.

For descriptions of carrying related information about the VTE link by using the PCEP-LS message and a related packet format of the PCEP message, refer to related descriptions of the embodiment corresponding to FIG. 7. Details are not described herein again.

It can be learned that in the hybrid network, the controller may separately obtain the network topology information of the first network and the second network of different network types by using a same control channel protocol. When the controller obtains the path determining requirement for the data transmission path, because the controller has the network topology information of the first network and the second network, during computation of the data transmission path, the controller can determine the path computation result including the transmission path parts of the first network and the second network, without performing additional information exchange with another device, and send the path computation result to the first network device. In this way, planning efficiency of the data transmission path is improved.

Figure 9:
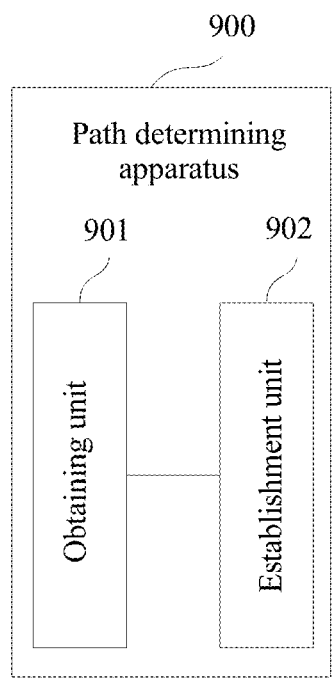
FIG. 9 is a structural diagram of a path determining apparatus according to an embodiment of the present invention.

FIG. 9 is a structural diagram of a path determining apparatus according to an embodiment of the present invention. The path determining apparatus 900 is applied to a hybrid network including one controller for implementing a control function, the hybrid network includes a first network and a second network, both a first network device and a second network device are network devices in the first network, and the path determining apparatus 900 includes an obtaining unit 901 and an establishment unit 902.

The obtaining unit 901 is configured to obtain a path computation result sent by the controller, where the path computation result is calculated by the controller based on an identifier of the first network device, an identifier of the second network device, network topology information of the first network, and network topology information of the second network, the path computation result includes a computation result of a transmission path part of a data transmission path in the first network and a computation result of a transmission path part of the data transmission path in the second network, and the data transmission path is a data transmission path from the first network device to the second network device that includes the transmission path part in the first network and the transmission path part in the second network.

The establishment unit 902 is configured to establish the data transmission path based on the path computation result.

Optionally, the obtaining unit is specifically configured to obtain a PCEP message sent by the controller, where the PCEP message carries the path computation result, the PCEP message includes a plurality of path information fields successively arranged based on a transmission sequence of the data transmission path, the path information field is used to carry interface information of a link, in the data transmission path, on a network device, and the interface information includes egress interface information or ingress interface information of the link, in the data transmission path, on the network device.

Optionally, for one link in the data transmission path, the PCEP message carries at least interface information of at least one of an egress interface and an ingress interface of the link on a network device by using the path information field.

Optionally, the PCEP message includes a PCEP-reply message or a PCEP-update message.

The apparatus embodiment in the technical solutions of the present invention is described from the perspective of a network device in FIG. 9. For feature descriptions of the embodiment corresponding to FIG. 9, refer to related descriptions of the embodiment corresponding to FIG. 2. Details are not described herein again.

Figure 10:
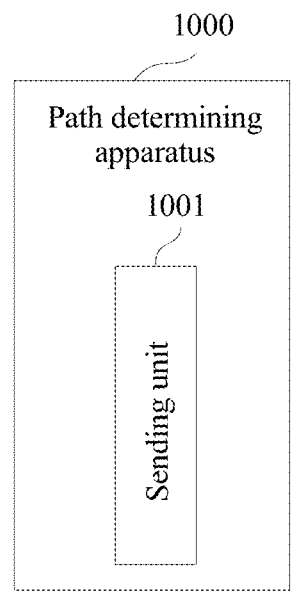
FIG. 10 is a structural diagram of a path determining apparatus according to an embodiment of the present invention.

FIG. 10 is a structural diagram of a path determining apparatus according to an embodiment of the present invention. The path determining apparatus 1000 is applied to a hybrid network including one controller for implementing a control function, the hybrid network includes a first network and a second network, the second network is an optical network, and the path determining apparatus 1000 includes a sending unit 1001.

The sending unit 1001 is configured to send network topology information of the second network to the controller according to a control channel protocol, where the control channel protocol is the same as a control channel protocol used by a network device in the first network to send network topology information of the first network to the controller.

Optionally, the control channel protocol is the PCEP, and the sending unit is specifically configured to send, to the controller, a PCEP-LS message that carries the network topology information of the second network, where a universal routing field in the PCEP-LS message identifies the second network by using a value.

Optionally, the PCEP-LS message further includes a node object used to identify a network device in the second network, the node object includes a descriptor of the network device in the second network, and the descriptor of the network device in the second network is used to carry an identifier and an attribute of the network device in the second network.

Optionally, the PCEP-LS message further includes a link object used to identify a network device in the second network; the link object includes a link descriptor, and the link descriptor is used to carry link information of a link between the network device in the second network and a neighboring network device; and the link descriptor includes a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

Optionally, a target network device is a network device in a data transmission path, a previous network device of the target network device in the data transmission path is a network device in the first network according to a transmission sequence of the data transmission path, and the data transmission path is a data transmission path from a first network device to a second network device that includes a transmission path part in the first network and a transmission path part in the second network; both the first network device and the second network device are network devices in the first network; and the apparatus further includes a receiving unit.

The receiving unit is configured to obtain a computation result of the transmission path part of the data transmission path in the second network from the previous network device; and an establishment unit is further configured to establish the data transmission path based on the computation result of the transmission path part of the data transmission path in the second network.

The apparatus embodiment in which the network topology information is sent to the controller in the technical solutions of the present invention is described from the perspective of the network device in FIG. 10. For feature descriptions of the embodiment corresponding to FIG. 10, refer to related descriptions of the embodiments corresponding to FIG. 4, FIG. 5, and FIG. 6. Details are not described herein again.

The following further describes the technical solutions of the present invention from the perspective of a system.

Figure 11:
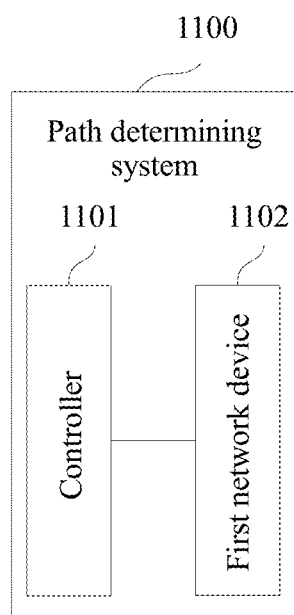
FIG. 11 is a structural diagram of a path determining system according to an embodiment of the present invention.

FIG. 11 is a structural diagram of a path determining system according to an embodiment of the present invention. The path determining system 1100 is applied to a hybrid network including one controller for implementing a control function, the hybrid network includes a first network and a second network, and the path determining system 1100 includes a controller 1101 and a first network device 1102.

The controller 1101 is configured to: obtain a path determining requirement, where the path determining requirement is used to request to determine a data transmission path from the first network device to a second network device that includes a transmission path part in the first network and a transmission path part in the second network, the path determining requirement includes an identifier of the first network device and an identifier of the second network device, and both the first network device and the second network device are network devices in the first network; obtain network topology information of the first network from a network device in the first network and network topology information of the second network from a network device in the second network according to a control channel protocol; calculate a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network; and send the path computation result to the first network device.

The first network device 1102 is configured to: obtain the path computation result sent by the controller; and establish the data transmission path based on the path computation result.

Figure 12:
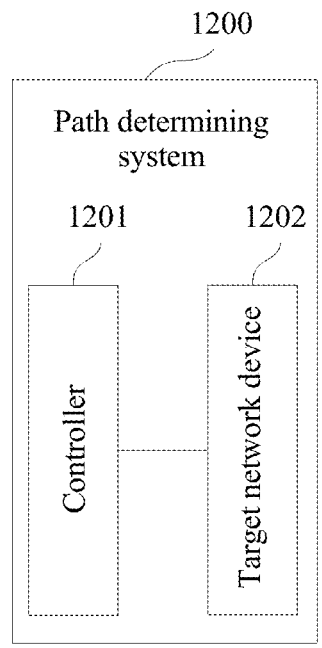
FIG. 12 is a structural diagram of a path determining system according to an embodiment of the present invention.

FIG. 12 is a structural diagram of a path determining system according to an embodiment of the present invention. The path determining system 1200 is applied to a hybrid network including one controller 1201 for implementing a control function, the hybrid network includes a first network and a second network, the second network is an optical network, a target network device 1202 is a network device in the second network, and the path determining system 1200 includes the controller 1201 and the target network device 1202.

The controller 1201 is configured to: obtain a path determining requirement, where the path determining requirement is used to request to determine a data transmission path from a first network device to a second network device that includes a transmission path part in the first network and a transmission path part in the second network, the path determining requirement includes an identifier of the first network device and an identifier of the second network device, and both the first network device and the second network device are network devices in the first network; obtain network topology information of the first network from a network device in the first network and network topology information of the second network from a network device in the second network according to a control channel protocol; calculate a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network; and send the path computation result to the first network device.

The target network device 1202 is configured to send the network topology information of the second network to the controller according to the control channel protocol, where the control channel protocol is the same as a control channel protocol used by the network device in the first network to send the network topology information of the first network to the controller.

Figure 13:
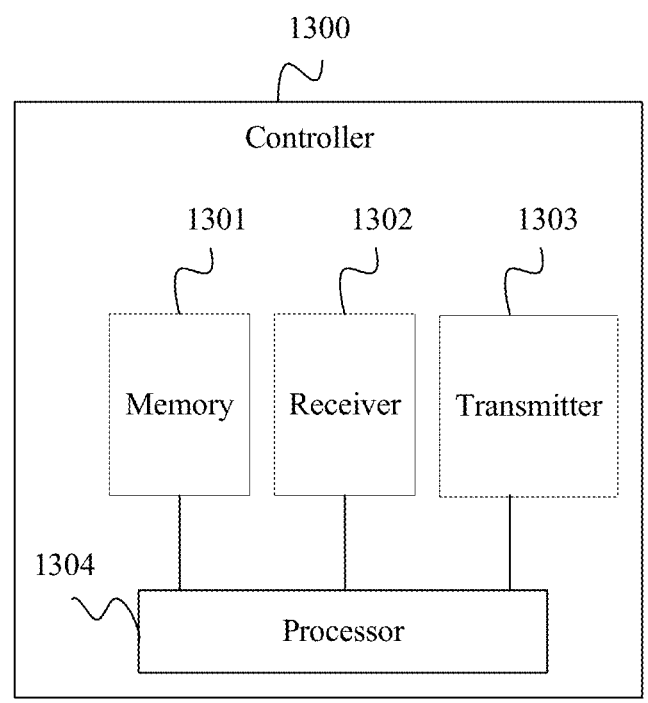
FIG. 13 is a schematic diagram of a hardware structure of a controller according to an embodiment of the present invention.

FIG. 13 is a schematic diagram of a hardware structure of a controller according to an embodiment of the present invention. The controller 1300 is a controller that implements a control function in a hybrid network, the hybrid network includes a first network and a second network, and the controller 1300 includes a memory 1301, a receiver 1302, a transmitter 1303, and a processor 1304 that is separately connected to the memory 1301, the receiver 1302, and the transmitter 1303. The memory 1301 is configured to store a set of program instructions, and the processor 1304 is configured to invoke the program instructions stored in the memory 1301 to perform the following operations:

triggering the receiver 1302 to obtain a path determining requirement, where the path determining requirement is used to request to determine a data transmission path from a first network device to a second network device that includes a transmission path part in the first network and a transmission path part in the second network, the path determining requirement includes an identifier of the first network device and an identifier of the second network device, and both the first network device and the second network device are network devices in the first network;

triggering the receiver 1302 to obtain network topology information of the first network from a network device in the first network and network topology information of the second network from a network device in the second network according to a control channel protocol;

calculating a path computation result based on the identifier of the first network device, the identifier of the second network device, the network topology information of the first network, and the network topology information of the second network, where the path computation result includes a computation result of the transmission path part of the data transmission path in the first network and a computation result of the transmission path part of the data transmission path in the second network; and triggering the transmitter 1303 to send the path computation result to the first network device.

Optionally, the processor 1304 may be a central processing unit (CPU), the memory 1301 may be an internal memory of a random access memory (RAM) type, the receiver 1302 and the transmitter 1303 may include a common physical interface, and the physical interface may be an Ethernet (Ethernet) interface or an asynchronous transfer mode (ATM) interface. The processor 1304, the transmitter 1303, the receiver 1302, and the memory 1301 may be integrated into one or more independent circuits or hardware, for example, an application-specific integrated circuit (ASIC).

Figure 14:
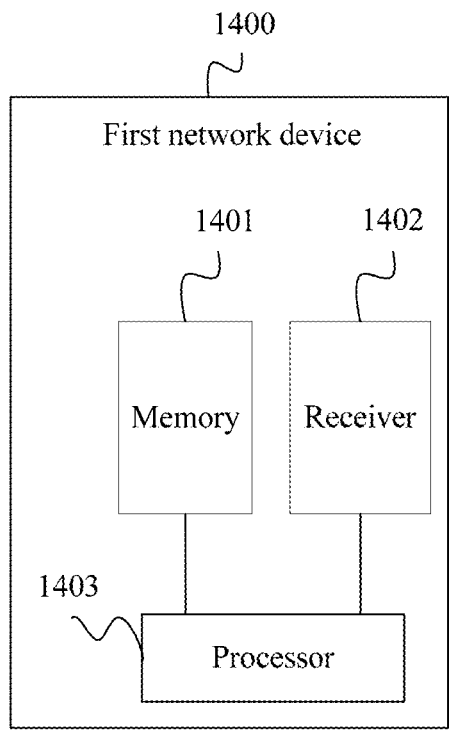
FIG. 14 is a schematic diagram of a hardware structure of a first network device according to an embodiment of the present invention.

FIG. 14 is a schematic diagram of a hardware structure of a first network device according to an embodiment of the present invention. The first network device is applied to a hybrid network including one controller for implementing a control function, the hybrid network includes a first network and a second network, both the first network device 1400 and a second network device are network devices in the first network, and the first network device 1400 includes a memory 1401, a receiver 1402, and a processor 1403 that is separately connected to the memory 1401 and the receiver 1402. The memory 1401 is configured to store a set of program instructions, and the processor 1403 is configured to invoke the program instructions stored in the memory 1401 to perform the following operations:

triggering the receiver 1402 to obtain a path computation result sent by the controller, where the path computation result is calculated by the controller based on an identifier of the first network device, an identifier of the second network device, network topology information of the first network, and network topology information of the second network, the path computation result includes a computation result of a transmission path part of a data transmission path in the first network and a computation result of a transmission path part of the data transmission path in the second network, and the data transmission path is a data transmission path from the first network device to the second network device that includes the transmission path part in the first network and the transmission path part in the second network; and establishing the data transmission path based on the path computation result.

Optionally, the processor 1403 may be a CPU, the memory 1401 may be an internal memory of a RAM type, the receiver 1402 may include a common physical interface, and the physical interface may be an Ethernet interface or an ATM interface. The processor 1403, the receiver 1402, and the memory 1401 may be integrated into one or more independent circuits or hardware, for example, an ASIC.

Figure 15:
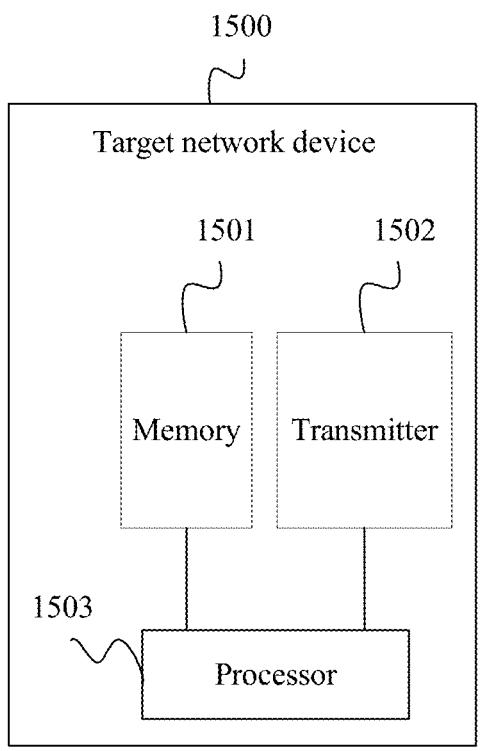
FIG. 15 is a schematic diagram of a hardware structure of a target network device according to an embodiment of the present invention.

FIG. 15 is a schematic diagram of a hardware structure of a target network device according to an embodiment of the present invention. The target network device is applied to a hybrid network including one controller for implementing a control function, the hybrid network includes a first network and a second network, the second network is an optical network, the target network device 1500 is a network device in the second network, and the target network device 1500 includes a memory 1501, a transmitter 1502, and a processor 1503 that is separately connected to the memory 1501 and the transmitter 1502. The memory 1501 is configured to store a set of program instructions, and the processor 1503 is configured to invoke the program instructions stored in the memory 1501 to perform the following operation:

triggering the transmitter 1502 to send network topology information of the second network to the controller according to a control channel protocol, where the control channel protocol is the same as a control channel protocol used by a network device in the first network to send network topology information of the first network to the controller.

The processor 1503 may be a CPU, the memory 1501 may be an internal memory of a RAM type, the transmitter 1502 may include a common physical interface, and the physical interface may be an Ethernet interface or an ATM interface. The processor 1503, the transmitter 1502, and the memory 1501 may be integrated into one or more independent circuits or hardware, for example, an ASIC.

"First" in the first network and the first network device mentioned in the embodiments of the present invention is merely used for name identification, and does not mean being the first in sequence. This rule is also applicable to "second".

A person of ordinary skill in the art may understand that all or some of the steps of the method embodiments may be implemented by a program instructing relevant hardware. The program may be stored in a computer readable storage medium. When the program runs, the steps of the method embodiments are performed. The storage medium may be at least one of the following media: media that are capable of storing program code, for example, a read-only memory (ROM), a RAM, a magnetic disk, or an optical disc.

It should be noted that the embodiments in this specification are all described in a progressive manner, for same or similar parts in the embodiments, refer to these embodiments, and each embodiment focuses on a difference from other embodiments. Especially, device and system embodiments are basically similar to the method embodiment, and therefore are described briefly; for related parts, refer to partial descriptions in the method embodiment. The described device and system embodiments are merely examples. The units described as separate parts may or may not be physically separate, and parts displayed as units may or may not be physical units, and may be located in one position, or may be distributed on a plurality of network units. Some or all the modules may be selected based on actual needs to achieve the objectives of the solutions of the embodiments. A person of ordinary skill in the art may understand and implement the solutions of the embodiments without creative efforts.

The foregoing descriptions are merely examples of implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A path determining method, applied to a hybrid network comprising one controller for implementing a control function, wherein the hybrid network comprises a first network and a second network, and the method comprises:

obtaining, by the controller, a path determining requirement, wherein the path determining requirement is used to request to determine a data transmission path from a first network device to a second network device, the data transmission path comprising a transmission path part in the first network and a transmission path part in the second network, and the path determining requirement comprises an identifier of the first network device and an identifier of the second network device, both the first network device and the second network device being network devices in the first network, wherein the second network is an optical network;

obtaining, by the controller, according to the path determining requirement, network topology information of the first network from a network device in the first network and network topology information of the second network from a network device in the second network according to a same control channel protocol;

calculating, by the controller, a path computation result based on the identifier of the first network device in the path determining requirement, the identifier of the second network device in the path determining requirement, the network topology information of the first network, and the network topology information of the second network, wherein the path computation result comprises a computation result of the transmission path part of the data transmission path in the first network and a computation result of the transmission path part of the data transmission path in the second network; and sending, by the controller, the path computation result to the first network device.

2. The method according to claim 1, wherein the sending, by the controller, the path computation result to the first network device comprises:

sending, by the controller to the first network device, a Path Computation Element Communication Protocol (PCEP) message that carries the path computation result, wherein the PCEP message comprises path information fields, the path information fields are used to carry interface information of network devices through which the data transmission path successively passes, the interface information comprises egress interface information or ingress interface information of the network devices, and for one link in the data transmission path, the PCEP message carries interface information of at least one of an egress interface and an ingress interface of the link on a network device by using the path information field.

3. The method according to claim 2, wherein the PCEP message comprises a Path Computation Element Communication Protocol reply (PCEP-reply) message or a Path Computation Element Communication Protocol update (PCEP-update) message.

4. The method according to claim 1, wherein the same control channel protocol is the Path Computation Element Communication Protocol (PCEP), and the obtaining network topology information of the second network from a network device in the second network comprises:

obtaining, by the controller, the network topology information of the second network based on a Path Computation Element Communication Protocol link state (PCEP-LS) message sent by the network device in the second network, wherein a universal routing field in the PCEP-LS message identifies the second network by using a value.

5. The method according to claim 4, wherein the PCEP-LS message further comprises a node object used to identify the network device in the second network, the node object comprises a descriptor of the network device in the second network, and the descriptor of the network device in the second network is used to carry an identifier and an attribute of the network device in the second network.

6. The method according to claim 4, wherein the PCEP-LS message further comprises a link object used to identify the network device in the second network;

the link object comprises a link descriptor, and the link descriptor is used to carry link information of a link between the network device in the second network and a neighboring network device; and the link descriptor comprises a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

7. A path determining apparatus, applied to a hybrid network comprising one controller for implementing a control function, wherein the hybrid network comprises a first network and a second network, and the apparatus comprises a memory storing instructions; and one or more processors in coupled to the memory, and configured to execute the instructions to:

obtain a path determining requirement, wherein the path determining requirement is used to request to determine a data transmission path from a first network device to a second network device, the data transmission path comprising a transmission path part in the first network and a transmission path part in the second network, the path determining requirement comprises an identifier of the first network device and an identifier of the second network device, both the first network device and the second network device being network devices in the first network, wherein the second network is an optical network;

according to the path determining requirement, obtain network topology information of the first network from a network device in the first network and network topology information of the second network from a network device in the second network according to a same control channel protocol;

calculate a path computation result based on the identifier of the first network device in the path determining requirement, the identifier of the second network device in the path determining requirement, the network topology information of the first network, and the network topology information of the second network, wherein the path computation result comprises a computation result of the transmission path part of the data transmission path in the first network and a computation result of the transmission path part of the data transmission path in the second network; and send the path computation result to the first network device.

8. The apparatus according to claim 7, wherein the one or more processors execute the instructions to send, to the first network device, a Path Computation Element Communication Protocol (PCEP) message that carries the path computation result, wherein the PCEP message comprises path information fields, the path information fields are used to carry interface information of network devices through which the data transmission path successively passes, the interface information comprises egress interface information or ingress interface information of the network devices, and for one link in the data transmission path, the PCEP message carries interface information of at least one of an egress interface and an ingress interface of the link on a network device by using the path information field.

9. The apparatus according to claim 7, wherein the same control channel protocol is the Path Computation Element Communication Protocol (PCEP), and the one or more processors execute the instructions to obtain the network topology information of the second network based on a Path Computation Element Communication Protocol link state (PCEP-LS) message sent by the network device in the second network, wherein a universal routing field in the PCEP-LS message identifies the second network by using a value.

10. The apparatus according to claim 9, wherein the PCEP-LS message further comprises a node object used to identify the network device in the second network, the node object comprises a descriptor of the network device in the second network, and the descriptor of the network device in the second network is used to carry an identifier and an attribute of the network device in the second network.

11. The apparatus according to claim 9, wherein the PCEP-LS message further comprises a link object used to identify the network device in the second network;
the link object comprises a link descriptor, and the link descriptor is used to carry link information of a link between the network device in the second network and a neighboring network device; and
the link descriptor comprises a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

12. A path determining apparatus, applied to a hybrid network comprising one controller for implementing a control function, wherein the hybrid network comprises a first network and a second network, the second network is an optical network, both a first network device and a second network device are network devices in the first network, and the apparatus comprises
a memory storing instructions; and
one or more processors coupled to the memory, and configured to execute the instructions to:
obtain a path computation result sent by the controller, wherein the path computation result is calculated by the controller based on an identifier of the first network device, an identifier of the second network device, network topology information of the first network, and network topology information of the second network, wherein the network topology information of the first network from a network device in the first network and the network topology information of the second network from a network device in the second network are obtained by the controller according to a same control channel protocol, the path computation result comprises a computation result of a transmission path part of a data transmission path in the first network and a computation result of a transmission path part of the data transmission path in the second network, and the data transmission path is a data transmission path from the first network device to the second network device that comprises the transmission path part in the first network and the transmission path part in the second network; and
establish the data transmission path based on the path computation result.

13. The apparatus according to claim 12, wherein the one or more processors execute the instructions to obtain a Path Computation Element Communication Protocol (PCEP) message sent by the controller, wherein the PCEP message carries the path computation result, the PCEP message comprises a plurality of path information fields successively arranged based on a transmission sequence of the data transmission path, the path information field is used to carry interface information of a link, in the data transmission path, on a network device, the interface information comprises egress interface information or ingress interface information of the link, in the data transmission path, on the network device, and for one link in the data transmission path, the PCEP message carries interface information of at least one of an egress interface and an ingress interface of the link on a network device by using the path information field.

14. A path determining apparatus comprises
a memory comprising storing instructions; and
one or more processors coupled to the memory, wherein the one or more processors execute the instructions to:
send network topology information of a second network to a controller according to a control channel protocol, wherein the control channel protocol is the same as a control channel protocol used by a network device in the a first network to send network topology information of the first network to the controller; wherein the first network and the second network are comprised in a hybrid network, the second network is an optical network, and the hybrid network comprising the controller for implementing a control function;
wherein the control channel protocol is the Path Computation Element Communication Protocol (PCEP), and the one or more processors execute the instructions to send, to the controller, a Path Computation Element Communication Protocol link state (PCEP-LS) message that carries the network topology information of the second network, wherein a universal routing field in the PCEP-LS message identifies the second network by using a value;
wherein the PCEP-LS message further comprises a node object used to identify a network device in the second network or a link object used to identify a network device in the second network, the node object comprises a descriptor of the network device in the second network, and the descriptor of the network device in the second network is used to carry an identifier and an attribute of the network device in the second network; or the PCEP-LS message further comprises a link object used to identify a network device in the second network, the link object comprises a link descriptor, and the link descriptor is used to carry link information of a link between the network device in the second network and a neighboring network device; and the link descriptor comprises a descriptor of the network device in the second network, a descriptor of the neighboring network device, and a link identifier field, and the link identifier field is used to carry interface information of the network device in the second network and interface information of the neighboring network device on the link between the network device in the second network and the neighboring network device.

15. The apparatus according to claim 14, wherein a target network device is a network device in a data transmission path, a previous network device of the target network device in the data transmission path is a network device in the first network according to a transmission sequence of the data transmission path, and the data transmission path is a data transmission path from a first network device to a second network device that comprises a transmission path part in the first network and a transmission path part in the second network; both the first network device and the second network device are network devices in the first network; and the one or more processors further execute the instructions to:
obtain a computation result of the transmission path part of the data transmission path in the second network from the previous network device; and establish the data transmission path based on the computation result of the transmission path part of the data transmission path in the second network.

\* \* \* \* \*